US011698879B2

(12) United States Patent
Choudhary et al.

(10) Patent No.: US 11,698,879 B2
(45) Date of Patent: Jul. 11, 2023

(54) FLEXIBLE ON-DIE FABRIC INTERFACE

(71) Applicant: Intel Corporation, Santa Clara, CA (US)

(72) Inventors: Swadesh Choudhary, Mountain View, CA (US); Robert G. Blankenship, Tacoma, WA (US); Siva Prasad Gadey, Portland, OR (US); Sailesh Kumar, Los Altos, CA (US); Vinit Mathew Abraham, Hillsboro, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 16/914,327

(22) Filed: Jun. 27, 2020

(65) Prior Publication Data

US 2020/0327084 A1 Oct. 15, 2020

Related U.S. Application Data

(60) Provisional application No. 62/944,773, filed on Dec. 6, 2019.

(51) Int. Cl.
*G06F 13/40* (2006.01)

(52) U.S. Cl.
CPC ................................ *G06F 13/4027* (2013.01)

(58) Field of Classification Search
CPC ............................. G06F 13/40; G06F 13/4027
See application file for complete search history.

(56) References Cited

U.S. PATENT DOCUMENTS

| | | | |
|---|---|---|---|
| 8,205,111 | B2 | 6/2012 | Hill et al. |
| 2016/0179710 | A1 | 6/2016 | Sharma et al. |
| 2019/0102311 | A1 | 4/2019 | Gupta et al. |

FOREIGN PATENT DOCUMENTS

| | | |
|---|---|---|
| WO | 2017052661 A1 | 3/2017 |

OTHER PUBLICATIONS

EPO Communication Pursuant to Rule 62a(1) EPC and Rule 63(1) EPC in EP Application Serial No. 22209604.2-1224 dated Dec. 16, 2022 (3 pages).
EPO; Extended European Search Report issued in EP Patent Application No. 20196158.8, dated Feb. 23, 2021 10 pages.
Microchip Technology Inc.; "Stand-Alone CAN Controller with SPI Interface;" retrieved from the Internet at URL:http://ww1.microchip.com/downloads/en/DeviceDoc/MCP2515-Stand-Alone-CAN-Controller-with-SPI-20001801J.pdf; May 31, 2003; 94 pages.
EPO; Extended European Search Report issued in EP Patent Application No. 21165826.5, dated Jul. 21, 2021; 10 pages.
EPO European Extended Search Report in EP Application Serial No. 22209604.2 dated Mar. 24, 2023 (10 pages).
India Patent Office Examination Report in IN Patent Application Serial No. 20204401620 dated Mar. 10, 2023 (4 pages).

*Primary Examiner* — Henry Tsai
*Assistant Examiner* — Christopher A Daley
(74) *Attorney, Agent, or Firm* — Alliance IP, LLC

(57) ABSTRACT

An interface for coupling an agent to a fabric supports a set of coherent interconnect protocols and includes a global channel to communicate control signals to support the interface, a request channel to communicate messages associated with requests to other agents on the fabric, a response channel to communicate responses to other agents on the fabric, and a data channel to couple to communicate messages associated with data transfers to other agents on the fabric, where the data transfers include payload data.

25 Claims, 20 Drawing Sheets

1300

1400b

FLEXIBLE ON-DIE FABRIC INTERFACE

RELATED APPLICATIONS

This application claims benefit to U.S. Provisional Patent Application Ser. No. 62/944,773, filed Dec. 6, 2019, the disclosure of which is considered part of and is hereby incorporated by reference in its entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
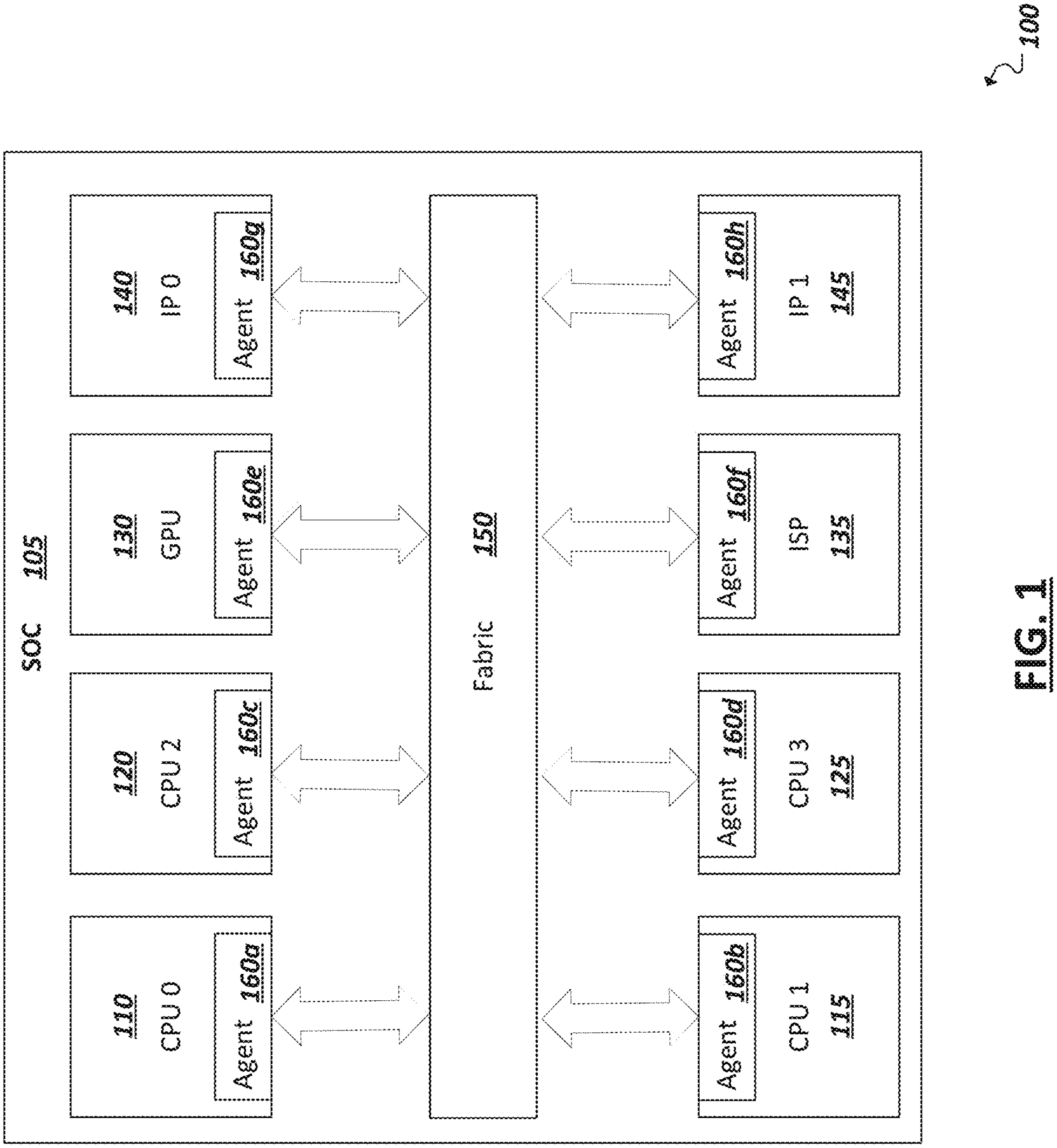
FIG. 1 is a simplified block diagram illustrating an example embodiment of a system on chip (SoC) device.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to efficient high-speed data transmission and configurability in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments may be applied to computing systems embodied as servers, blades, desktop computer systems, system on chip (SoC) device, handheld devices, tablets, set top boxes, in-vehicle computing systems, computer vision system, gaming systems, machine learning systems, and embedded applications. As will become readily apparent in the description below, the embodiments of methods, apparatus', and systems described herein (whether in reference to hardware, firmware, software, or a combination thereof) are beneficial to the development of high-performance computer interconnects and their respective systems.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One example interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Traditionally, dedicated wire interfaces are separately provided for each protocol (e.g., IDI, CMI, CXL, etc.) to be supported in the system. For instance, in an SoC, each IP block agent may be equipped with its own proprietary wire interface to couple to and enable communication with one or more SoC components implementing the interconnect fabric and application layer of the SoC (e.g., a fabric block, a network on chip (NOC) device, buses, switches, etc.). Each dedicated wire interface may have a different way of implementing link layer functionality such as connect, reset, dis-connect, flow control. Such dedicated interfaces also utilize large number of wires for agents that use multiple protocols. This large wire count increases design area and power usage of the system. Fabric-specific interfaces have also been used, which may allow for multiple protocols and more wire efficiency, but little to no scalability, as the fabric is complex, custom-designed interface for a specific system that must be redesigned for each subsequent generation or system modification, among other example shortcomings.

A flexible wire interface, such as described herein, may address these and other issues present in traditional systems, for instance, by being configurable to meet the needs of potential any fabric interconnect, including interconnects in server applications, client CPU SoC development, among other examples. In some implementations, such a flexible on-die wire interface (or link layer) may be defined to support multiple various protocols, such as IDI, UPI, and memory protocols, among other examples. In one example, the interface definition may be applied to implement an interface to support the sub-protocols of Compute Express Link (CXL), such as the CXL.mem and CXL.cache protocols, for external IP development. The interface definition may support upstream (e.g., device) and downstream (e.g., host) direction. Some implementations may additionally support switches and non-host fabric extensions, among other examples.

Turning to the simplified block diagram 100 of FIG. 1, a simplified example of a system on chip (SoC) device 105 is illustrated. An SoC map be implemented as an integrated circuit that incorporates multiple components of a computer, or computing blocks (or intellectual property (IP) blocks). Such blocks (e.g., 110, 115, 120, 125, 130, 135, 140, 145) may include components such as one or more CPU components 110, 115, 120, 125 (e.g., a microprocessor or microcontroller), special purpose processors 130, 135 (e.g., graphics processing units (GPUs), image signal processors (ISPs), tensor processor units, accelerator devices, etc.), memory components, input/output (I/O) ports, secondary storage blocks, and other compute blocks on a single die or substrate, such as a silicon die.

Compute blocks (e.g., 110, 115, 120, 125, 130, 135, 140, 145) of an example SoC 105 may be interconnected by an SoC fabric (e.g., 150). The fabric 150 may be implemented itself using a set of one or more IP blocks facilitating communication between compute blocks (e.g., 110, 115, 120, 125, 130, 135, 140, 145). In some implementations, the fabric 150 may be implemented as a network on chip (NOC), such as a NOC implemented one or more circuitry blocks.

Communication by the various blocks (e.g., 110, 115, 120, 125, 130, 135, 140, 145) may be facilitated through protocol agents (e.g., 160*a-h*) provided on the blocks (e.g., 110, 115, 120, 125, 130, 135, 140, 145). Each agent (e.g., 160*a-h*) may include logic (e.g., implemented in hardware circuitry, firmware, and/or software) to implement all or a subset of layers of one or more interconnect protocols (e.g., PCIe, Compute Express Link (CXL), Gen-Z, OpenCAPI, In-Die Interface (IDI), Cache Coherent Interconnect for Accelerators (CCIX), UltraPath Interconnect (UPI), etc.) through which the corresponding compute block is to communicate with other compute blocks in the system. As discussed herein, the agents may couple to the fabric 150 via a respective interface. While such agents may have traditionally coupled to fabrics via proprietary wire interfaces, one or more agents (e.g., 160*a-h*) may utilize respective instances of a configurable flexible on-die wire interface, which may be deployed to support the multiple different protocols of multiple different agents of the SoC 105, among other example implementations.

As introduced above, a flexible wire interface, or Unified Fabric Interface (UFI), allows many protocols to flow on a single wire interface coupling an agent to a fabric, thereby allowing for wire efficiency similar to custom, fabric-specific interfaces. In some implementations, UFI may omit fabric specific details and allow intellectual property (IP) blocks, or other computing blocks (e.g., 160*a-h*), to be developed in isolation from the fabric 150. The result are clean computing block interfaces that allow reuse, while allowing the system interconnect fabric to evolve over time without changing the component computing blocks and allowing for consistent and simple link layer flows (e.g., Reset, Connect, Disconnect, Flow control) interfacing the system (e.g., system on chip (SoC)) fabric 150, among other example advantages. Thus, UFI may provide a simple, clean, and verifiable interface for computing block development model for both Agent IP blocks (e.g., PCIe, CXL, Cores) and Fabric IP blocks (e.g., Server Coherent Fabric (SCF), Client Coherent Fabric (CCF), Netspeed™, etc.), among other examples.

Figure 2:
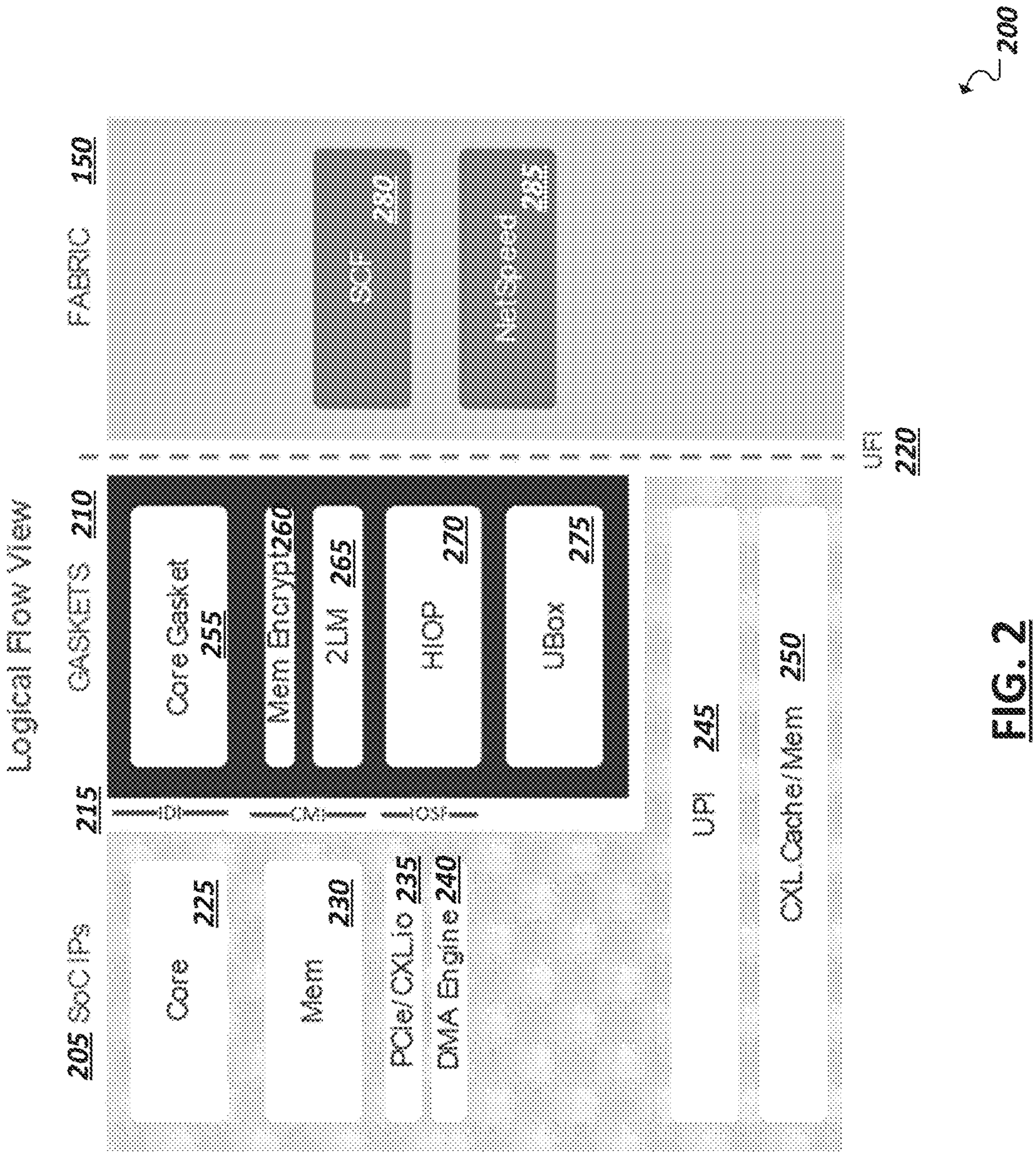
FIG. 2 is a simplified block diagram of an example logical flow view of an example computing system.

FIG. 2 is a simplified block diagram 200 illustrating an example logical flow view of an example computing system (e.g., an SoC). The SoC may include SoC IP blocks (e.g., 205), one or more gaskets (e.g., 210), and an interconnect fabric (e.g., 150). SoC IP blocks (e.g., 205) may include processor core blocks (e.g., 225), memory blocks (e.g., 230), and interconnect protocol blocks such as input/out (I/O) protocol blocks (e.g., 235), direct memory access (DMA) blocks (e.g., 240), an inter-processor communication protocol (e.g., UPI) block (e.g., 245), a cache coherency protocol (e.g., CXL.mem/CXL.cache) block (e.g., 250), among other example IP blocks. In some instances, protocol-specific logic of some agents (e.g., of blocks 245, 250) may have at least some awareness of the fabric topology (e.g., awareness of sockets in the system, the caching agents of the system, etc.) and may interface directly with the fabric. Gaskets (e.g., 210) may be utilized to facilitate communication of some other blocks (e.g., 225, 230, 235, 240) which are unaware of the fabric topology. The gaskets 210 may include logic to provide topology and protocol aware translation between the IP block at the fabric 150, providing protocol layer translation to the network layer(s) of the fabric. Examples of gaskets may include a core gasket 255, memory encrypt logic 260, two level memory (2LM) logic 265, host I/O processor (HIOP) 270 (e.g., to convert Load/Store protocols like PCIe to unordered protocols like IDI/UPI while maintaining the system requirements that allow producer/consumer work flows to function), and uBox logic 275. A gasket may also act as a bridge to other interfaces 215 (e.g., a bridge (e.g., to an IOSF interface)), among other examples.

A UFI interface 220, such as discussed herein, may be implemented in a system to provide a clean protocol boundary to the fabric 150 or gasket 210 perimeters of the system, allowing computing blocks 205 (e.g., IP blocks) within the system (e.g., a SoC) to operate without knowledge of fabric details. For instance, the fabric may implement standard and simple bridges, providing basic functions such as address decoding and flow control. Gaskets may implement optional SoC-specific stand-alone functions that sit between the fabric and an agent (that implements UFI to the fabric and agent). Further, a UFI interface may define configurable physical channels to satisfy the bandwidth requirements of individual computing blocks, among other example features and advantages.

Figure 3:
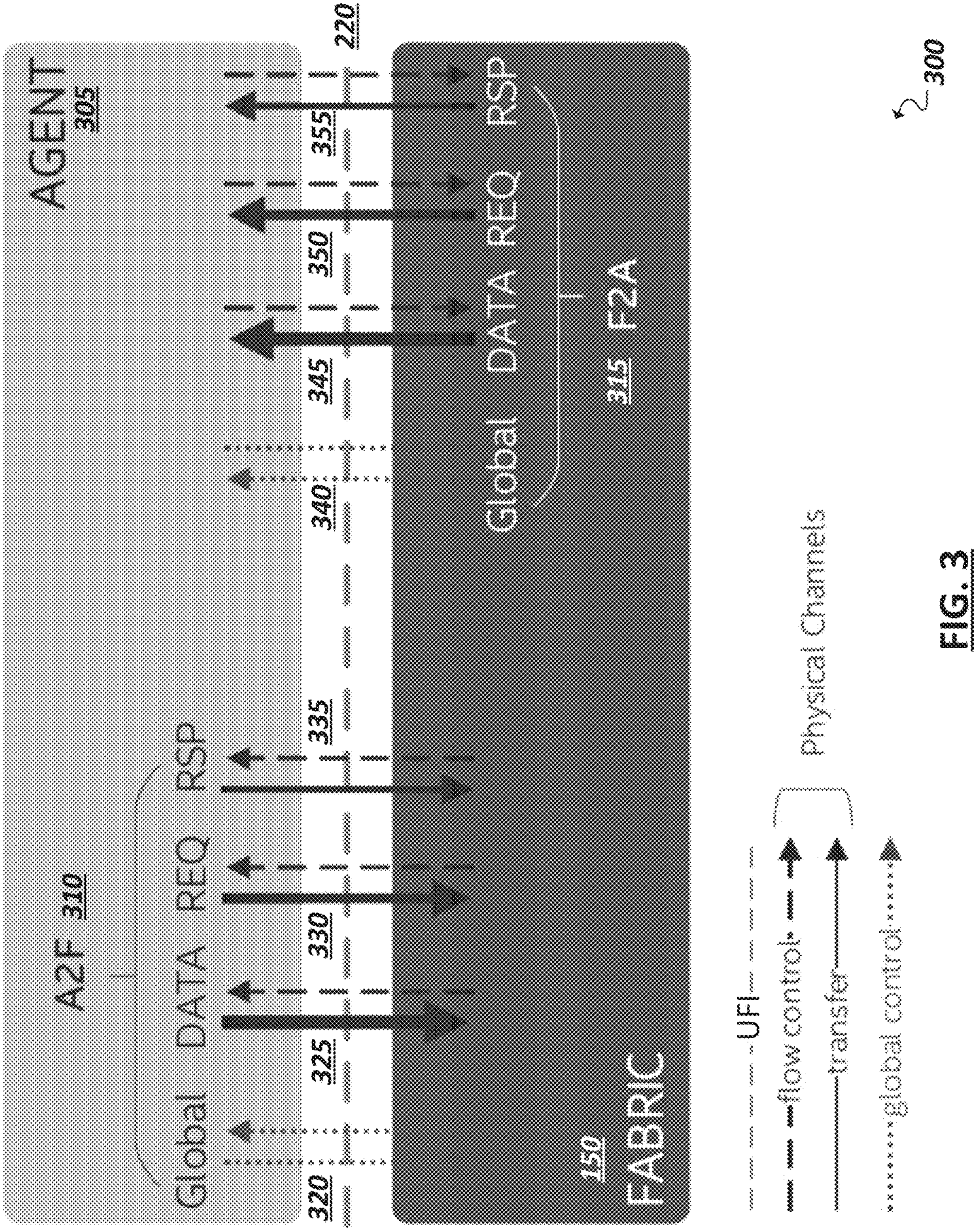
FIG. 3 is a simplified block diagram illustrating an example flexible on-die fabric interface.

UFI may define a standard interface between agents and the interconnect fabric of a system. The agents can be a variety of IP blocks or other computing elements (e.g., hardware elements) that are connected into the fabric and can have different profiles (upstream ports and/or downstream ports), as well as different protocol or bandwidth requirements. The fabric is expected to support the requirements of the agents within the bounds of UFI and the associated protocols tunneled on UFI. Turning to FIG. 3, a simplified block diagram 300 is shown illustrating of channels of an example UFI interface 220 coupling an agent 305 to a fabric 150. In some implementations, a UFI may define three physical channels in each direction (a set of agent-to-fabric (A2F) channels 310 and a set of fabric-to-agent (F2A) channels 315) to implement the interface 220, including a Request (REQ) physical channel (e.g., 330, 350), a Response (RSP) physical channel (e.g., 335, 355), and a Data physical channel (e.g., 325, 345). In some implementations, the UFI further includes a Global control channel 320, 340 to support global control signals that are common across the three primary physical channels.

The UFI definition may flexibly map multiple, various protocols (e.g., In-Die Interface (IDI), UPI, CXL.mem, etc.) over these physical channels. A UFI offers substantial configurability within the system it is deployed. For instance, the protocols supported may be configured, as well as the number of channels needed to meet the performance and potentially different fabrics used in the system, among other factors. For instance, Tables 1 and 2 below illustrate example use cases where protocols profiles and number of physical channels vary. The combination of protocol and number of channels may be regarded as the "Agent Profile."

TABLE 1

Protocol Profile Examples

| Agents | IDI | IDI_SA | UPI_NC | UPI_Coh | CXL.MEM |
|---|---|---|---|---|---|
| CORE | X | | | | |
| UPI AGENT | | | X | X | |
| IOSF | X | | X | | |
| CXL | X | | | | X |
| MEM | | | | | X |
| UBOX | X | X | X | | |

TABLE 2

Agent Profile Examples

| | Interface | A2F | | | F2A | | |
|---|---|---|---|---|---|---|---|
| Agent | Profile | REQ | Data | RSP | REQ | Data | RSP |
| UBOX | IDI_SA, IDI1, UPI_NC | 1 | 1 | 1 | — | 1 | 1 |
| IOSF | IDI, UPI_NC | 2 | 1 | 1 | 1 | 2 | 2 |
| | UPI_NC | — | 1 | 1 | — | 1 | 1 |
| CXL | IDI, CXL.Mem | 1 | 1 | 2 | 2 | 1 | 1 |
| UPI | UPI_COH, UPI_NC | 1 | 1 | 1 | 1 | 1 | 1 |
| | UPI_NC | — | 1 | 1 | — | 1 | 1 |
| Core | IDI | 1 | 1 | 1 | 1 | 1 | 1 |

Table 1 illustrates a listing of example agents (e.g., Core, UPI Agent, etc.) that may be included on IP blocks included in a system and identifies the collection of protocols the logic of the corresponding agent supports (e.g., an ISOF agent may support IDI and non-coherent UPI (UPI_NC), while a uBox agent supports IDI, IDI system agent (IDI_SA), and non-coherent UPI, etc.). In traditional systems, different, separate wire interfaces (connecting the agent to fabric) may be provided for each one of the supported protocols of the agent (e.g., three separate wire interfaces on an example uBox agent to support its three protocols). Applying a UFI interface allows an IP block to replace these multiple interfaces with a single UFI interface to connect to the fabric that supports communication using any of the multiple supported protocols. For instance, Table 2 illustrates examples of the UFI channels to be implemented in a single UFI interface to support each of the example agents listed in the rightmost column of Table 2. For instance, a UFI interface for an example CXL agent may support both IDI and CXL.Mem and include 1 Request channel, 1 Data channel, and 2 Response channels in the A2F direction and 2 Request channels, 1 Data channel, and 1 Response channel in the F2A direction. In some cases, a supported protocol may not make use of one of the UFI channels—accordingly, such channels may be omitted in some UFI instances. As an example, the uBox agent identified in Table 2 supports IDI_SA, IDI, and UPI_NC and, based on these protocols, does not need a Request channel in the F2A direction (which is omitted in its UFI instance), among other examples.

Returning to the discussion of FIG. 3, each channel (e.g., 320, 325, 330, 335, 340, 345, 350, 355) may be composed of a set of physical wires or lanes, each wire assigned to carry signals of a particular type. In a UFI interface, a set of physical lanes (e.g., wires or other conductors) may be provided and assigned to various channels, which embody logical sets of signals defined for the interface and assigned to respective physical lanes of the interface. Each device may possess pins and corresponding UFI logic (implemented in hardware circuitry and/or software) to implement its end (the transmitter or receiver), or instance, of the interface and couple to the physical lanes embodying the connection between the transmitter and receiver on the interface. Accordingly, a set of signals may be defined under UFI for each of the channels, such as discussed below. Some of the defined signals may have a defined width and format for every channel instance, regardless of the protocols supported on the corresponding UFI interface. Other signals may be based on the attributes of the supported protocols (e.g., the length of the protocols' headers) and the operating speed of the agent (e.g., with agents that run slower than the fabric compensating for this with longer data channels, etc.), among other example features. In this manner, data may be sent in parallel with requests and responses used to manage coherency of a system, together with link training and control signals sent over dedicated global control channels (e.g., 320, 340), among other example advantages.

To illustrate certain general principles of a UFI, non-limiting example of potential UFI implementations are discussed herein. For instance, as one such example, a UFI interface may be configured to support multiple, different sub-protocols of CXL (e.g., CXL.io, CXL.mem, CXL.cache) are mapped onto the physical channels of UFI. Such an implementation may be referred to as a CXL-cache/mem Protocol Interface (CPI) to map such coherent protocols between an agent and a fabric. In accordance with the above, a UFI implementation (e.g., CPI) may allow mapping of multiple different protocols (e.g., CXL.mem and CXL.cache) on the same physical wires (implementing the channels of the UFI interface).

Compute Express Link, or CXL, is a low-latency, high-bandwidth discrete or on-package link that supports dynamic protocol multiplexing (or muxing) of a coherency protocol (CXL.cache), memory access protocol (CXL.mem), and IO protocol (CXL.io). CXL.cache is an agent coherency protocol that supports device caching of host memory, CXL.mem is a memory access protocol that supports device-attached memory, and CXL.io is a PCIe-based non-coherent I/O protocol with enhancements for accelerator support. CXL is intended to thereby provide a rich set of protocols to support a vast spectrum of devices, such as accelerator devices. Depending on the particular accelerator usage model, all of the CXL protocols (CXL.io, CXL.mem, CXL.cache) or only a subset may be enabled to provide a low-latency, high-bandwidth path for a corresponding computing block or device (e.g., an accelerator) to access the system.

In UFI, the specific choices of channel mapping and physical wire sharing between different protocols may be protocol- and implementation-specific and these various mappings may all be allowed by the UFI definition. For instance, in some implementations, depending on whether the component is a downstream port or an upstream port, different channels of CXL.cache and CXL.mem become relevant for the agent-to-fabric (A2F) direction or the fabric-to-agent (F2A) direction. For instance, in the example of FIG. 3, CXL.cache and CXL.mem protocols may be mapped onto the physical channels (e.g., 320, 325, 330, 335, 340, 345, 350, 355) connecting a corresponding CXL agent to a fabric, among other examples. Table 3 illustrates an example of the channels, which may be used in one example of a CPI UFI implementation. For instance, Table 3 captures the profiles in terms of physical channels for CXL.cache and CXL.mem in the context of the agent-to-fabric connectivity of the upstream port and downstream port in an example implementation of UFI. In the case of CPI, the number of CXL.cache and CXL.mem, each of the physical channels used by an agent may be an implementation choice, for instance, based on the bandwidth requirements of the agent.

TABLE 3

CPI Agent Profile Examples

| Protocol | A2F | | | F2A | | |
|---|---|---|---|---|---|---|
| Profile | REQ | RSP | DATA | REQ | RSP | DATA |
| CXL.CACHE (Upstream) | X | X | X | X | X | X |
| CXL.MEM (Upstream) | X | — | X | — | X | X |
| CXL.CACHE (Downstream) | X | X | X | X | X | X |
| CXL.MEM (Downstream) | — | X | X | X | — | X |

Figure 4:
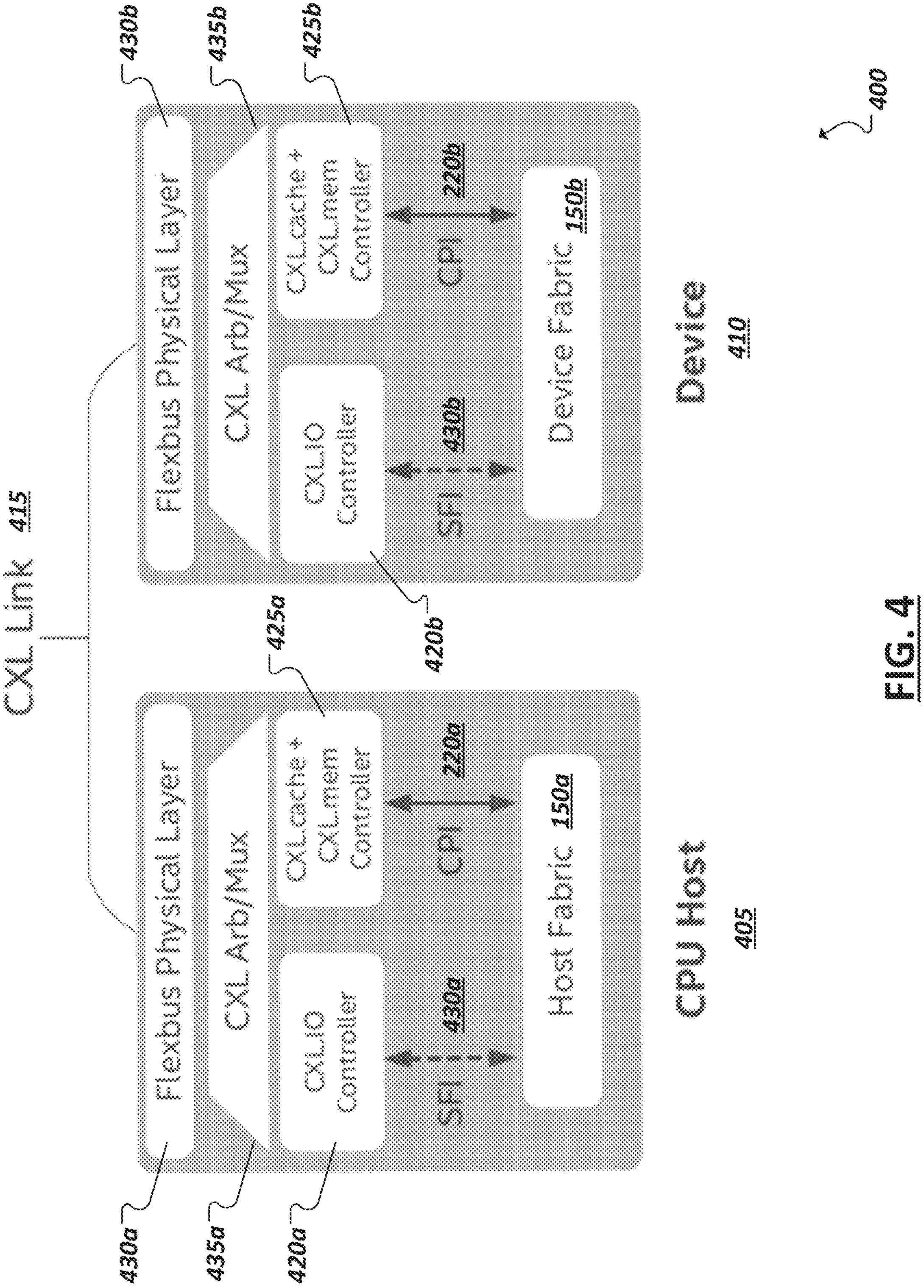
FIG. 4 is a simplified block diagram illustrating an example Compute Express Link (CXL) topology.

Turning to FIG. 4, a simplified block diagram 400 is shown illustrating example agents and the coupling of such agents to a fabric. FIG. 4 shows an example system topology for ports supporting a CXL link 415. For instance, a CXL link 415 may couple a CPU host device 405 to another device 410 (e.g., a memory device or accelerator device). Each agent (on devices 405, 410) may include link layer logic (e.g., 420*a-b*, 425*a-b*) to support each of the sub-protocols of CXL (e.g., CXL.io, CXL.mem, CXL.cache). In the case of CXL.mem and CXL.cache, a common controller (e.g., 425*a-b*) may be utilized. Protocol multiplexing may be facilitated through CXL arbitration/multiplexing logic (e.g., 425*a-b*, implemented, in hardware circuitry), which interfaces with a Flex Bus physical layer (e.g., 430*a-b*). Flex Bus may be implemented as a flexible high-speed port that is statically configured to support either PCIe or CXL. Flex Bus allows for either a PCIe protocol or CXL protocol to be sent over a high-bandwidth, off-package link. The protocol selection in the Flex Bus PHY 430*a-b* may take place during boot time via auto negotiation, based on the application.

Continuing with the example of FIG. 4, a UFI implementation (e.g., CPI) 220*a*, 220*b* is used for coherent protocols such as CXL.cache and CXL.mem, whereas another UFI implementation or a different wire interface definition (e.g., 430*a*, 430*b*) (e.g., a streaming fabric interface (SFI)) is used for load/store protocols like PCIe and CXL.io. In one example, a streaming fabric interface (SFI) 430*a-b* may serve as an intermediate interface, which makes no assumptions around protocol- or application-specific responsibilities between the transmitter and receiver an provide a scalable streaming interface that can sustain high bandwidth requirements of load/store protocols (e.g., PCIe, CXL.io, etc.). SFI does not contain a standalone protocol definition, the SFI semantics provided to support different protocols capable of being mapped to the flow control and virtual channel semantics provided by the SFI definition, among other examples and interface implementations.

As shown in FIG. 4, a system may employ example UFI instantiations 220*a-b* (e.g., CPI instantiations). Such UFI instantiations 220*a-b* allow wires to be shared at the fabric and achieve wire efficiency at the fabric and agent perimeters by allowing different protocols to share common wires. For instance, in a UFI implementation, the channels of various protocols originating from agents may be carefully mapped to a minimal set of physical channels and virtual channels, so that the bandwidth and channel isolation requirements of the agents and protocols are satisfied with the lowest total wire count. UFI may not contain any new protocol definitions. Instead, a UFI maps existing protocols to a common set of channels. To maximize the wire sharing across various protocols, UFI provides that the protocols use common flow control and virtualization features (e.g., defined in UFI) on their channels. In some implementations of a UFI, depending on the instantiation, certain protocols may be mapped to use common data widths and control signal widths. In some instances, the virtual channel definition of UFI is included for every mapped protocol. Ordering considerations within or across channels may be set, although messages may be assumed to be unordered when ordering considerations are left undefined, among other example features.

Figure 5B:
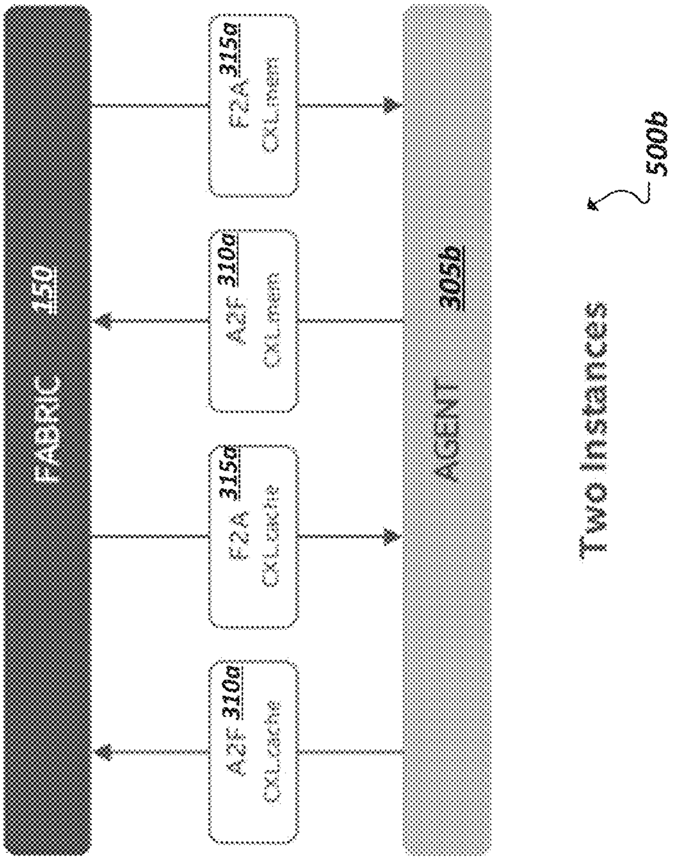
FIGS. 5A-5B are simplified block diagrams illustrating embodiments of a flexible on-die fabric interface.
Figure 5A:
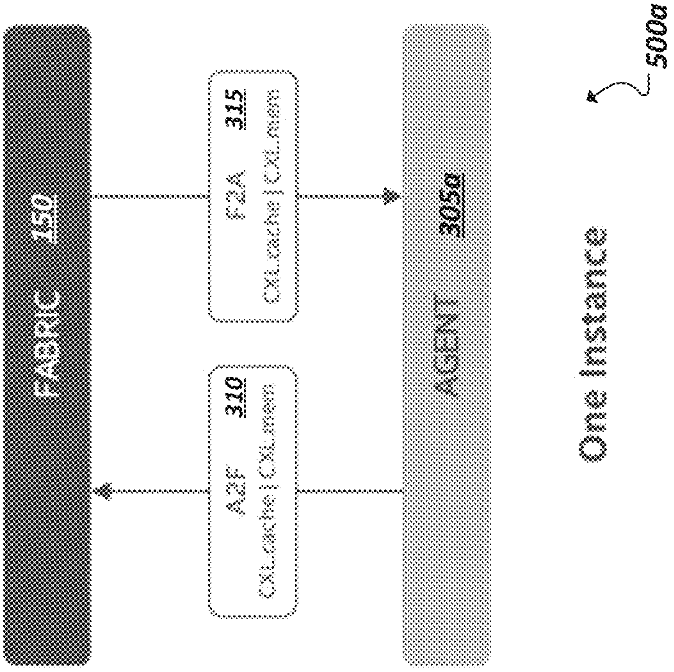

Turning to FIGS. 5A-5B, some implementations of a UFI interface may utilize the same interface to support communication between agent and fabric using any of the agent's supported protocol. For instance, the block diagram 500*a* of FIG. 5A illustrates an example where a single instance of the UFI interface is used to support both CXL.cache and CXL.mem in a CPI implementation. On the other hand, as shown in the block diagram 500*b* of FIG. 5B, an alternative implementation of the UFI interface may provide two separate instances of the UFI interface, a first (310*a*, 315*a*) for CXL.cache and a second (310*b*, 315*b*) for CXL.mem, among other example agents and protocols. Indeed, some agents might expose only a single protocol per UFI interface and instead choose to replicate UFI interfaces rather than map multiple protocols to a single UFI interface. Such implementations may choose to thereby simplify a design at the cost of using additional wires and logic.

As introduced above, the UFI interface defines three physical channels in each direction: Request (REQ), Response (RSP), and DATA. The REQ channels carry requests from agent-to-fabric and fabric-to-agent respectively. Address and protocol-level command information for transactions are encapsulated in the header field of data transmitted over the channel. The physical REQ channels may transport a single transaction per cycle, and the width of the channel (e.g., the number of physical lanes provided to implement the channel) may be determined by the maximum width needed to transport a single request among all protocols sharing this physical channel. The Data channels carries all messages which have data transfer between agents. This may include write data, read response data, snoop response data, and so forth. The Data channels allows sending transactions with multiple FLITs (FLow Control UnITs). For example, a 64B transfer with a data channel carrying 32B of data may be sent over two FLITs, among other examples. The RSP channels carry responses without data. For requests generated by agents, receiving agents from the fabric send back responses using this physical channel. These responses can be completions, snoop responses, and so on. Such responses may not carry address bits, so this channel may utilize a comparatively narrower header field than REQ in some implementations. Indeed, the RSP physical channel may transport single Flow Control Unit (FLIT) messages. Common signals, which apply to all the physical channels, are referred to as Global signals and additional lanes of the interface may be defined to carry such signals. For instance, Global signals may be used to support initialization, disconnect, and miscellaneous error reporting, among other functions. The UFI physical channels are used by the different protocols that are being mapped to the UFI interface. To match the link bandwidth to the fabric bandwidth, multiple instantiations of the same channel for REQ, DATA, and RSP channels may be allowed. Additionally, it is not a requirement that every protocol use all the channels of the UFI, among other example features and implementations.

A UFI instance may have a global channel and a variable number of REQ, DATA, and RSP channels in each direction, between agent and fabric. At a first level, the signals are grouped into the direction of the flow of data as agent-to-fabric (A2F) and fabric-to-agent (F2A). The global layer carries signals that apply across all physical channels. For instance, Table 4 shows example A2F global signals and Table 5 describes example F2A global signals. The width identifies the number of physical connections (e.g., wires or lanes) utilized in the channel to implement the signal.

TABLE 4

A2F Global Channel Wires

| Signal Group | Signal Name | Direction | Width | Description |
|---|---|---|---|---|
| Initialization | txcon_req | Agent->Fabric | 1 | Connection request from transmitter: (0->1 connection request, 1->0 disconnection request) |
| | rxcon_ack | Fabric->Agent | 1 | Connection acknowledge (ACK) from receiver: (0->1 connection acknowledge, 1->0 disconnection acknowledge) |

TABLE 4-continued

| A2F Global Channel Wires | | | | |
|---|---|---|---|---|
| Signal Group | Signal Name | Direction | Width | Description |
| | rxdiscon_nack | Fabric->Agent | 1 | Disconnection NACK (negatively acknowledge) from receiver |
| | rx_empty | Fabric->Agent | 1 | Receiver queues are empty for all channels and all credits have been returned |
| Reliability, Availability, and Serviceability (RAS) | fatal | Agent->Fabric | 1 | Fatal error indication from agent (level signal) |
| | viral | Agent->Fabric | 1 | Used to signal viral condition from agent to fabric (level signal) |

TABLE 5

| F2A Global Channel Wires | | | | |
|---|---|---|---|---|
| Signal Group | Signal Name | Direction | Width | Description |
| Initialization | txcon_req | Fabric->Agent | 1 bit | Connection request from transmitter: (0->1 connection request, 1->0 disconnection request) |
| | rxcon_ack | Agent->Fabric | 1 bit | Connection acknowledge from receiver: (0->1 connection acknowledge, 1->0 disconnection acknowledge) |
| | rxdiscon_nack | Agent->Fabric | 1 bit | Disconnection NACK from receiver |
| | rx_empty | Agent->Fabric | 1 bit | Receiver queues are empty for all channels and all credits have been returned |
| RAS | fatal | Fabric->Agent | 1 bit | Fatal error indication from fabric (level signal) |
| | viral | Fabric->Agent | 1 bit | Used to signal viral condition from fabric to agent (level signal) |

The Request, or REQ, layer of the UFI carries requests from agent-to-fabric and fabric-to-agent. Address and protocol level command information are encapsulated in the Header field, or signal, of the REQ Layer. As headers, and the information contained within a header, may be protocol-specific, a mapping may be defined to map the protocol-specific information to bits (and the specific wires utilized to send those bits). Further, given the protocol-specific nature of headers, the width of the header signal may also be configurable and adjusted to support the protocols implemented on the UFI. Other fields, or signals, may be protocol agnostic and the signal width may be fixed. The REQ Layer signals of UFI may be provided to be symmetric in the A2F and F2A directions, even though some protocols may not utilize or provide for such symmetry. As an example, CXL.cache and CXL.mem are not symmetric protocols. Thus, the Upstream and Downstream versions of CXL.cache and CXL.mem map as different protocols. Indeed, implementations may only support the relevant subset of the protocols used for functionality. Table 6 illustrates an example of the signals and signal widths within the UFI REQ layer. The direction specifies signal directions from the perspective of a transmitter (Tx) of packets and a receiver (Rx) of packets.

TABLE 6

| Fields of the REQ Layer | | | | |
|---|---|---|---|---|
| Signal Class | Signal Name | Direction | Width | Description |
| VALID | req_is_valid | Tx->Rx | 1 bit | Valid bit for the FLOW CONTROL and HEADER signal classes |
| | req_block | Rx->Tx | 1 bit | Transient back pressure from Rx due to rate mismatch on a clock crossing at the interface boundary |
| FLOW CONTROL | req_protocol_id | Tx->Rx | 4 bits | Identifies between protocols, if multiple protocols are using the same physical wires. As an example, in a UFI for CXL.cache and CXL.mem: 4'h1000: Upstream Port CXL.cache 4'h1001: Upstream Port CXL.mem 4'h1010: Downstream Port CXL.cache 4'h1011: Downstream Port CXL.mem This signal is optional or unused for agents with a single protocol. |

TABLE 6-continued

Fields of the REQ Layer

| Signal Class | Signal Name | Direction | Width | Description |
|---|---|---|---|---|
| | req_vc_id | Tx->Rx | 4 bits | Indicates the virtual channel (VC) used for the corresponding packet. It also identifies the flow control used when req_shared_credit = 0. As an example, in a UFI for CXL.cache and CXL.mem, only 1 channel id is supported (encoding 4'h0). Indeed, this signal may be optional or unused for physical channels with only a single VC per protocol. |
| | req_shared_credit | Tx->Rx | 1 bit | Indicates if the HDR uses shared (a value of 1) or dedicated credits (a value of 0). Optional if only dedicated credits are used. |
| HEADER | req_header | Tx->Rx | H bits | Protocol-specific header information. |
| CREDIT | req_rxcrd_valid | Rx->Tx | 1 bit | Indicates a valid dedicated credit return. |
| | req_rxcrd_protocol_id | Rx->Tx | 4 bits | Identifies which protocol the credits are returned to. Optional for agents with a single protocol. |
| | req_rxcrd_vc_id | Rx->Tx | 4 bits | Virtual channel for which credit is returned. Optional for physical channels with only a single VC per protocol. |
| | req_rxcrd_shared | Rx->Tx | 1 bit | Indicates a shared credit return. Optional if only dedicated credits are used. |
| | req_txblock_crd_flow | Tx->Rx | 1 bit | Tx requesting Rx to block the credit returns due to transient back pressure. An example is a clock crossing FIFO. |

As noted above, the header signal (HDR) size is variable and is based on the protocol that is being transported over the UFI interface. When multiple protocols are carried over the UFI interface, the HDR width is sized for the maximum size of the HDR being transported over the interface, or to the largest headers size of the multiple supported protocols. The reserved field width is primarily used to cover the unused portion of the HDR. The transmitter drives 0 on the reserved field, with the corresponding receiver ignoring this field.

TABLE 7

Mapping CXL.Cache Protocol to HDR for an Upstream Port

| Agent-to-Fabric REQ (A2F/H2D) | | Fabric-to-Agent REQ (F2A/D2H) | |
|---|---|---|---|
| Field | Position | Field | Position |
| Opcode[2:0] | [2:0] | Opcode[4:0] | [4:0] |
| UQID[11:0] | [14:3] | CQID[11:0] | [16:5] |
| AddressParity | [15] | NT | [17] |
| Address[51:6] | [61:16] | Reserved | [19:18] |
| Reserved | [62+R:62] | AddressParity | [20] |
| — | — | Address [51:6] | [66:21] |
| — | — | Reserved | [67+R:67] |

To illustrate an example mapping of a protocol header to the UFI HDR signal, Tables 7 and 8 illustrate an example mapping of the CXL.cache protocol to the Request channel HDR signal in the upstream and downstream directions. For instance, the widths of the different fields (except for AddressParity) are given as per the specification for CXL-.cache. In one example, AddressParity is computed as an XOR of all the bits of the Address field. For the upstream port, A2F corresponds to host-to-device (H2D) channel on the compute express link (CXL), and F2A corresponds to the device-to-host (D2H) channel on CXL. For the downstream port, A2F corresponds to D2H channel on CXL, and F2A corresponds to H2D channel on CXL. For a Downstream port, the Device Trust Level field defined in the CXL Security Policy Register is also a part of D2H requests. In this example, only a single virtual channel is supported on these channels for CXL.cache.

TABLE 8

Mapping CXL.cache Protocol to HDR for a Downstream Port

| Agent-to-Fabric REQ (A2F/H2D) | | Fabric-to-Agent REQ (F2A/D2H) | |
|---|---|---|---|
| Field | Position | Field | Position |
| Opcode[4:0] | [4:0] | Opcode[2:0] | [2:0] |
| CQID[11:0] | [16:5] | UQID[11:0] | [14:3] |
| NT | [17] | AddressParity | [15] |
| Reserved | [19:18] | Address[51:6] | [61:16] |
| AddressParity | [20] | Reserved | [62+R:62] |
| Address [51:6] | [66:21] | — | — |
| Reserved | [67+R:67] | — | — |

Likewise, in an example where both CXL.cache and CXL.mem are to be supported on the same UFI implementation (e.g., in CPI), the CXL.mem header may also be mapped to the HDR signal, such as shown in the examples of Tables 9 and 10. In this example, the widths of the different fields (except for AddressParity) are given as per CXL specification, with AddressParity computed as an XOR of all the bits of the Address field. For an upstream port, A2F maps to Master-to-Subordinate (M2S) REQ channel on CXL.mem. For a downstream port, A2F maps to the Subordinate-to-Master (S2M) (e.g., and there is no REQ channel in this direction) and F2A maps to M2S REQ, among other examples. Currently only a single virtual channel is supported on these channels for CXL.mem.

TABLE 9

Mapping CXL.Mem Protocol to HDR for an Upstream Port Fabric-to-Agent REQ (F2A)

| Field | Position |
|---|---|
| Memopcode[3:0] | [3:0] |
| Tag[15:0] | [19:4] |
| TC[1:0] | [21:20] |
| SnpType[2:0] | [24:22] |
| Address[5] | [25] |
| Metafield[1:0] | [27:26] |
| Metavalue[1:0] | [29:28] |
| AddressParity | [30] |
| Address [51:6] | [76:31] |
| Reserved | [77+R:77] |

TABLE 10

Mapping CXL.mem Protocol to HDR for a Downstream Port Agent-to-Fabric REQ (A2F)

| Field | Position |
|---|---|
| Memopcode[3:0] | [3:0] |
| Tag[15:0] | [19:4] |
| TC[1:0] | [21:20] |
| SnpType[2:0] | [24:22] |
| Address[5] | [25] |
| Metafield[1:0] | [27:26] |
| Metavalue[1:0] | [29:28] |
| AddressParity | [30] |
| Address [51:6] | [76:31] |
| Reserved | [77+R:77] |

In some UFI implementations, ordering rules may be defined and applied based on the protocols employed, among other implementation-specific factors and configurations enabled by UFI. As an example, when multiple instantiations of a REQ channel are implemented (e.g., to match link bandwidth to fabric bandwidth), ordering may be needed. For instance, in the example of CPI, the following ordering rules may be applicable to CXL.cache traffic to maintain the ordering semantics outlined in the CXL specification when multiple REQ channels are implemented: Concurrent messages on the same clock cycle are unordered with respect to each other; Responses received on the RSP channel(s) must be considered to be ahead of requests received on the REQ channel on the same clock cycle. Similarly, for CXL.mem traffic, ordering rules may be defined and enforced such that CXL.mem requests are mapped to a specific instance using a hash based on address. The specific hash is implementation specific, but every address is to map to only one instance to ensures that the CXL.mem M2S channel ordering outlined in the CXL specification is maintained.

In UFI, the DATA physical channel carries all messages which have data transfer between agents. This can include write data, read response data, snoop response data, and so forth. The data physical channel messages with data can be sent as multiple flow control units (or FLITs). The Data Layer signals may be provided to be symmetric in the A2F and F2A directions, even though some protocols (e.g., CXL.cache and CXL.mem) may not be. In instances, where data signals are asymmetric, the Upstream and Downstream versions of the DATA channel (e.g., CXL.cache and CXL.mem) map as different protocols. Table 11 illustrates the various signals (and corresponding wires) utilized to implement a UFI Data layer, with the direction column identifying the signal directions from the perspective of a transmitter (Tx) of packets and a receiver (Rx) of packets.

TABLE 11

Fields of Data Layer

| Signal Class | Signal Name | Direction | Width | Description |
|---|---|---|---|---|
| VALID | data_is_valid | Tx->Rx | 1 bit | Valid bit for the FLOW CONTROL and HEADER signal classes. PAYLOAD and EOP signal classes have a fixed timing relationship from HDR based on the DataHdrSep parameter |
| | data_block | Rx->Tx | 1 bit | Transient back pressure from Rx due to rate mismatch on a clock crossing at the interface boundary |
| FLOW CONTROL | data_protocol_id | Tx->Rx | 4 bits | Identifies between protocols, if multiple protocols are using the same physical wires. The same value is to be asserted for all pumps of a packet.<br>As an example, in a UFI for CXL.cache and CXL.mem:<br>4'h1000: Upstream Port CXL.cache<br>4'h1001: Upstream Port CXL.mem<br>4'h1010: Downstream Port CXL.cache<br>4'h1011: Downstream Port CXL.mem<br>This signal is optional or unused for agents with a single protocol. |

TABLE 11-continued

Fields of Data Layer

| Signal Class | Signal Name | Direction | Width | Description |
|---|---|---|---|---|
| | data_vc_id | Tx->Rx | 4 bits | Indicates the virtual channel (VC) used for the corresponding packet. It also identifies the flow control used when data_shared_credit = 0. As an example, in a UFI for CXL.cache and CXL.mem, only 1 channel id is supported (encoding 4'h0). Indeed, this signal may be optional or unused for physical channels with only a single VC per protocol. |
| | data_shared_credit | Tx->Rx | 1 bit | Indicates if the HDR uses shared (a value of 1) or dedicated credits (a value of 0). Optional if only dedicated credits are used. |
| HEADER | data_header | Tx->Rx | H bits | Protocol-specific header information. |
| | data_cmd_parity | Tx->Rx | 1 bit | Parity of the header fields (e.g., XOR of data_header) |
| PAYLOAD | data_body | Tx->Rx | D bytes | Data associated with the header. D is to be a multiple of 16 Bytes |
| | data_byte_enable | Tx->Rx | D bits | 1 bit per byte of data_body |
| | data_poison | Tx->Rx | 1 bit | Indication that the corresponding data chunk is corrupted and should not be used by Rx. |
| | data_parity | Tx->Rx | P bits | P = (D/16)*2. Two bits of parity are used for every 16 B of data. For instance: data_parity[n]= xor(data_body[63+64*n:64*n]) |
| EOP | data_eop | Tx->Rx | 1 bit | End of packet (EOP) indication |
| CREDIT | data_rxcrd_valid | Rx->Tx | 1 bit | Indicates a valid dedicated credit return. |
| | data_rxcrd_protocol_id | Rx->Tx | 4 bits | Identifies which protocol the credits are returned to. Optional for agents with a single protocol. |
| | data_rxcrd_vc_id | Rx->Tx | 4 bits | Virtual channel for which credit is returned. Optional for physical channels with only a single VC per protocol. |
| | data_rxcrd_shared | Rx->Tx | 1 bit | Indicates a shared credit return. Optional if only dedicated credits are used. |
| | data_txblock_crd_flow | Tx->Rx | 1 bit | Tx requesting Rx to block the credit returns due to transient back pressure. An example is a clock crossing FIFO. |

As with the REQ channel, the size of the DATA layer's header signal (HDR) may be variable and based on the protocol being transported over the interface. When multiple protocols are carried over the interface, the HDR width is sized for the maximum size of the HDR being transported over the UFI interface. Reserved field width is used to cover the unused portion of the HDR. For instance, the transmitter drives 0 on the reserved field, with the receiver ignoring this field. In some implementations, messages in the supported protocols carry 64B of data. Messages with 32B payloads may also be supported on the DATA channel. In both cases, a 64B worth credit may be used.

As an example of protocol header mapping on the DATA channel, mapping of CXL.cache and CXL.mem (e.g., in a CPI implementation) is provided as an illustrative example. For an interface carrying 64B of data, 64B transfers are sent over 1 cycle. The entire header is to also be sent over 1 cycle. For an interface carrying 32B of data, data body is 256 bits wide, and 64B transfers are sent over 2 cycles. The data_eop signal should assert on the second cycle, and data_header is valid on the first cycle, and the second cycle is reserved. For an interface carrying 16B of data, data body is 128 bits wide, and 64B transfers are sent over 4 cycles. The data_eop signal should assert on cycle 4, data_header is valid on the first cycle, and the second, third, and fourth cycles are reserved, among other examples. An example mapping of a CXL.cache data_header fields to data_header is shown in Table 12 and Table 13 for upstream and downstream ports, respectively. For upstream ports, A2F corresponds to H2D from CXL and F2A corresponds to D2H from CXL. For downstream ports, A2F corresponds to D2H and F2A corresponds to H2D. In some implementations, only a single virtual channel is supported on these channels for CXL.cache and CXL.mem.

TABLE 12

Mapping CXL.cache Protocol to data_header for an Upstream Port

| Agent-to-Fabric DATA (A2F) | | Fabric-to-Agent DATA (F2A) | |
|---|---|---|---|
| Field | Position | Field | Position |
| Go-Err | [0] | UQID | [11:0] |
| Reserved | [7:1] | Reserved | [12] |
| CQID | [19:8] | Bogus | [13] |

TABLE 12-continued

| Mapping CXL.cache Protocol to data_header for an Upstream Port | | | |
|---|---|---|---|
| Agent-to-Fabric DATA (A2F) | | Fabric-to-Agent DATA (F2A) | |
| Field | Position | Field | Position |
| ChunkValid | [20] | ChunkValid | [14] |
| Reserved | [20+R:20] | Reserved | [15+R:15] |

TABLE 13

| Mapping CXL.cache Protocol to data_header for a Downstream Port | | | |
|---|---|---|---|
| Agent-to-Fabric DATA (A2F) | | Fabric-to-Agent DATA (F2A) | |
| Field | Position | Field | Position |
| UQID | [11:0] | Go-Err | [0] |
| Reserved | [12] | Reserved | [7:1] |
| Bogus | [13] | CQID | [19:8] |
| ChunkValid | [14] | ChunkValid | [20] |
| Reserved | [15+R:15] | Reserved | [20+R:20] |

Similarly, Tables 14 and 15 show an example mapping of CXL.mem to the DATA header signal. For an interface carrying 64B of data, 64B transfers are sent over one cycle. The entire header is sent over one cycle as well. For an interface carrying 32B of data, data body is 256-bits wide, and 64B transfers are sent over two cycles. The data_eop signal should assert on cycle 2, and data_header is split evenly between the two cycles. If data_header is H bits wide, H is made even by padding with a Reserved bit if required. H/2 bits ([H/2-1:0]) are sent on the first cycle and the remaining bits are sent on the second cycle. For an interface carrying 16B of data, data body is 128-bits wide, and 64B transfers are sent over four cycles. The data_eop signal should assert on cycle four, and data_header is split evenly between the four cycles. If data_header is H bits wide, H is made a multiple of four by padding with Reserved bits if required. H/4 bits ([H/4-1:0]) are sent on the first cycle, ([H/2-1:H/4]) are sent on the second cycle, ([3H/4-1:H/2]) are sent on the third cycle and the remaining bits are sent on the fourth cycle, among other examples. An example mapping of CXL.mem data header fields to data_header is shown in Tables 14 and Tables 15 for upstream and downstream ports, respectively, where, for upstream ports, A2F corresponds to M2S RwD from CXL and F2A corresponds to S2M DRS from CXL. For downstream ports, A2F corresponds to S2M DRS and F2A corresponds to M2S RwD.

TABLE 14

| Mapping CXL.mem Protocol to data_header for an Upstream Port | | | |
|---|---|---|---|
| Agent-to-Fabric DATA (A2F) | | Fabric-to-Agent DATA (F2A) | |
| Field | Position | Field | Position |
| MemOpCode | [3:0] | OpCode | [2:0] |
| MetaField[1:0] | [5:4] | Reserved | [3] |
| MetaValue[1:0] | [7:6] | MetaField[1:0] | [5:4] |
| SnpType[2:0] | [10:8] | MetaValue[1:0] | [7:6] |
| TC[1:0] | [12:11] | Reserved | [15:8] |
| Reserved | [14:13] | Tag | [31:16] |
| AddressParity | [15] | Reserved | [31+R:31] |

TABLE 14-continued

| Mapping CXL.mem Protocol to data_header for an Upstream Port | | | |
|---|---|---|---|
| Agent-to-Fabric DATA (A2F) | | Fabric-to-Agent DATA (F2A) | |
| Field | Position | Field | Position |
| Address[Even Indices] | [38:16] | — | — |
| Tag | [54:39] | — | — |
| Address[Odd Indices] | [77:55] | — | — |
| Reserved | [77+R:77] | — | — |

TABLE 15

| Mapping CXL.mem Protocol to data_header for a Downstream Port | | | |
|---|---|---|---|
| Agent-to-Fabric DATA (A2F) | | Fabric-to-Agent DATA (F2A) | |
| Field | Position | Field | Position |
| OpCode | [2:0] | MemOpCode | [3:0] |
| Reserved | [3] | MetaField[1:0] | [5:4] |
| MetaField[1:0] | [5:4] | MetaValue[1:0] | [7:6] |
| MetaValue[1:0] | [7:6] | SnpType[2:0] | [10:8] |
| Reserved | [15:8] | TC[1:0] | [12:11] |
| Tag | [31:16] | Reserved | [14:13] |
| Reserved | [31+R:31] | AddressParity | [15] |
| — | — | Address[Even Indices] | [38:16] |
| — | — | Tag | [54:39] |
| — | — | Address[Odd Indices] | [77:55] |
| — | — | Reserved | [77+R:77] |

Various parameters may be provided for a UFI, which may allow further configuration of the DATA layer of the interface. For instance, a DataHdrSep parameter may be defined and a value set for the parameter to define how payloads follow a corresponding header on the DATA channel. For instance, the DataHdrSep parameter may indicate that the payload follows the sending of the corresponding header by a fixed separation of 0 to 3 cycles as defined in the parameter value. This parameter may be defined in each direction (A2F and F2A) to allow independent control. The DataHdrSep parameter may value set may apply to all protocols on the given UFI. The fixed separation allows the payload to be sent without a separate valid indication on the payload.

In some implementations, UFI may not permit intra-packet level interleaving within a protocol or across protocols. For instance, after a packet begins transmission across the interface, UFI may cause that the packet be sent across the interface until end of packet (EOP) is reached and asserted, before a different packet from the same or a different protocol can begin transmission. In implementations adopting this feature, the interface may benefit from this simplification that allows for simplified fabric and agent design, among other example benefits and alternative implementations.

For requests generated by agents or fabrics, receiving agents or fabrics send back corresponding responses using the RSP physical channel. Such responses may include completions, snoop responses, and so on. UFI provides for the RSP Layer signals to be symmetric in the A2F and F2A directions, although some protocols may not (and need not) make use of the signals in a symmetric manner. Again, protocols like CXL.cache and CXL.mem are not symmetric and may thus implement upstream and downstream versions of CXL.cache and CXL.mem as different mapped protocols. Table 16 illustrates example signals in an implementation of UFI, where the direction column identifies signal directions from the perspective of a transmitter (Tx) of packets and a receiver (Rx) of packets.

TABLE #16

| Fields of the RSP Layer | | | | |
|---|---|---|---|---|
| Signal Class | Signal Name | Direction | Width | Description |
| VALID | rsp__is__valid | Tx->Rx | 1 bit | Valid bit for the FLOW CONTROL and HEADER signal classes |
| | rsp__block | Rx->Tx | 1 bit | Transient back pressure from Rx due to rate mismatch on a clock crossing at the interface boundary |
| FLOW CONTROL | rsp__protocol__id | Tx->Rx | 4 bits | Identifies between protocols, if multiple protocols are using the same physical wires. As an example, in a UFI for CXL.cache and CXL.mem: 4'h1000: Upstream Port CXL.cache 4'h1001: Upstream Port CXL.mem 4'h1010: Downstream Port CXL.cache 4'h1011: Downstream Port CXL.mem This signal is optional or unused for agents with a single protocol. |
| | rsp__vc__id | Tx->Rx | 4 bits | Indicates VC used for the corresponding packet. It also identifies the flow control used when rsp__shared__credit = 0. As an example, in a UFI for CXL.cache and CXL.mem, only 1 channel id is supported (encoding 4'h0). Indeed, this signal may be optional or unused for physical channels with only a single VC per protocol. |
| | rsp__shared__credit | Tx->Rx | 1 bit | Indicates if the HDR uses shared (a value of 1) or dedicated credits (a value of 0). Optional if only dedicated credits are used. |
| HEADER | rsp__header | Tx->Rx | H bits | Protocol-specific header information. |
| CREDIT | rsp__rxcrd__valid | Rx->Tx | 1 bit | Indicates a valid dedicated credit return. |
| | rsp__rxcrd__protocol__id | Rx->Tx | 4 bits | Identifies which protocol the credits are returned to. Optional for agents with a single protocol. |
| | rsp__rxcrd__vc__id | Rx->Tx | 4 bits | Virtual channel for which credit is returned. Optional for physical channels with only a single VC per protocol. |
| | rsp__rxcrd__shared | Rx->Tx | 1 bit | Indicates a shared credit return. Optional if only dedicated credits are used. |
| | rsp__txblock__crd__flow | Tx->Rx | 1 bit | Tx requesting Rx to block the credit returns due to transient back pressure. An example is a clock crossing FIFO. |

As with the REQ and DATA channels, the size of the RSP HDR is variable and based on the protocol that is being transported over the interface. When multiple protocols are carried over the interface, the HDR width is sized for the maximum size of the RSP HDR being transported over the interface. The reserved field width is used to cover the unused portion of the HDR, with the transmitter driving 0 on the reserved wires (field) and the receiver ignoring this field. Further, as with the REQ and DATA channels, individual protocols may be mapped to the RSP HDR signal, with the widths of the different protocol-specific header fields defined according to their respective protocols. Tables 17 and 18 illustrate an example mapping for CXL.cache for an upstream port and a downstream port. In the example of CXL.cache, in the upstream port, A2F maps to H2D Response, and F2A maps to D2H Response. For downstream port, A2F maps to D2H Response and F2A maps to H2D Response. In some instances, for CXL.cache and CXL.mem implementations (e.g. in a CPI interface) a single virtual channel is supported on these channels.

TABLE 17

| Mapping CXL.cache to HDR for an Upstream Port | | | |
|---|---|---|---|
| Agent-to-Fabric RSP (A2F/H2D) | | Fabric-to-Agent RSP (F2A/D2H) | |
| Field | Position | Field | Position |
| Opcode | [3:0] | Opcode | [4:0] |
| CQID[11:0] | [15:4] | Reserved | [6:5] |
| RSP__PRE | [17:16] | UQID[11:0] | [18:7] |
| Reserved | [18] | Reserved | [19+R:19] |
| RspData | [30:19] | — | — |
| Reserved | [31+R:31] | — | — |

TABLE 18

| Mapping CXL.cache to HDR for a Downstream Port | | | |
|---|---|---|---|
| Agent-to-Fabric RSP (A2F/H2D) | | Fabric-to-Agent RSP (F2A/D2H) | |
| Field | Position | Field | Position |
| Opcode | [4:0] | Opcode | [3:0] |
| Reserved | [6:5] | CQID[11:0] | [15:4] |
| UQID[11:0] | [18:7] | RSP_PRE | [17:16] |
| Reserved | [19+R:19] | Reserved | [18] |
| — | — | RspData | [30:19] |
| — | — | Reserved | [31+R:31] |

Similarly, in an example mapping of the CXL.mem header to the UFI RSP HDR signal, the widths of the different fields may be protocol-defined, as shown in Tables 19 and 20. In the case of CXL.mem, for an upstream port, F2A maps to S2M NDR. For downstream port, A2F maps to S2M No Data Response (NDR).

TABLE 19

| Mapping CXL.mem to HDR for an Upstream Port Fabric-to-Agent RSP (F2A) | |
|---|---|
| Field | Position |
| Opcode | [2:0] |
| MetaField | [4:3] |
| MetaValue | [6:5] |
| Tag | [22:7] |
| Reserved | [23+R:23] |

TABLE 20

| Mapping CXL.mem to HDR for a Downstream Port Agent-to-Fabric RSP (A2F) | |
|---|---|
| Field | Position |
| Opcode | [2:0] |
| MetaField | [4:3] |
| MetaValue | [6:5] |
| Tag | [22:7] |
| Reserved | [23+R:23] |

Figure 6:
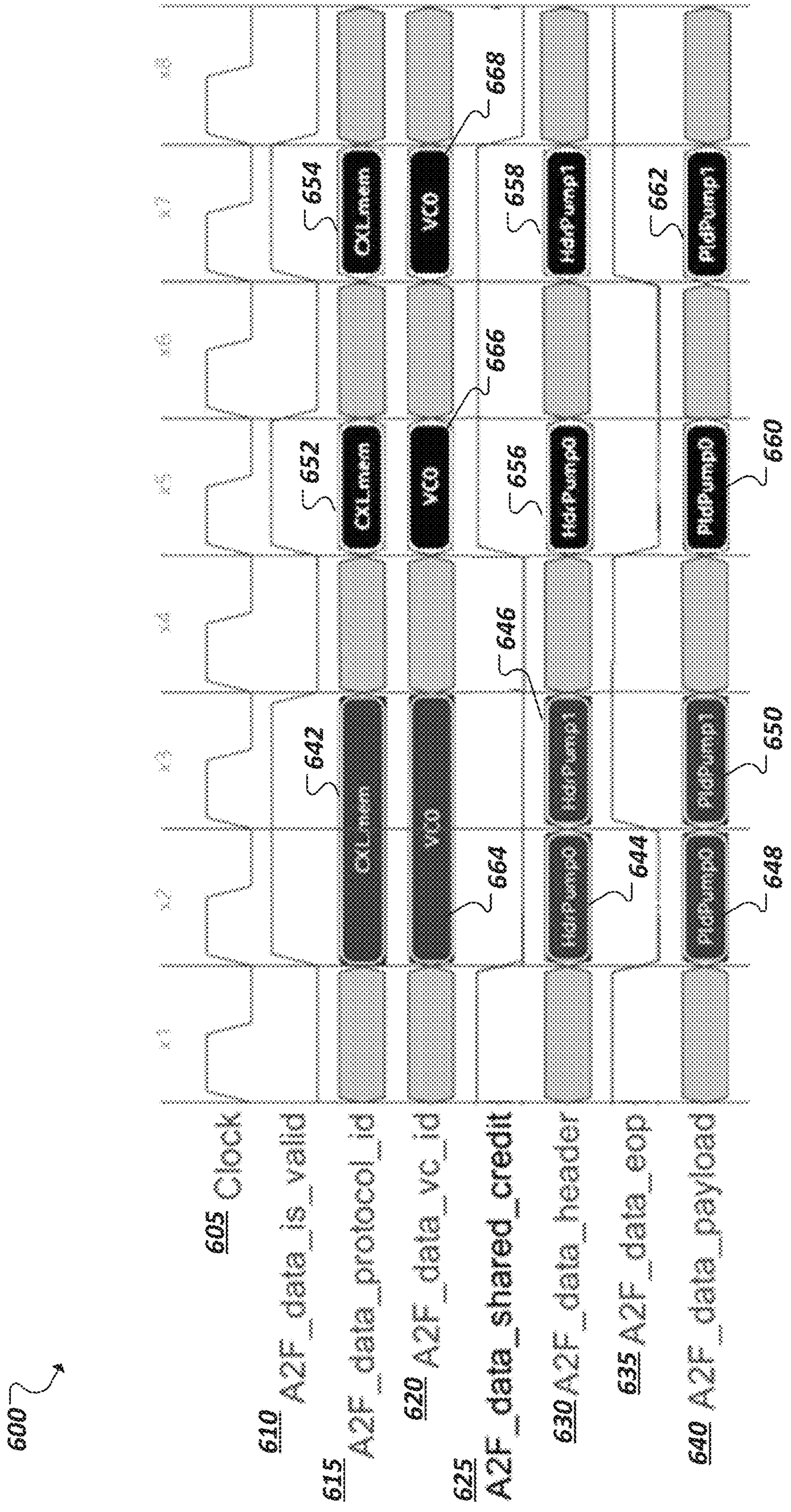
FIG. 6 is a timing diagram illustrating signaling over a channel of an example flexible on-die fabric interface.

FIG. 6 shows an example timing diagram 600 for signals in an example A2F DATA channel of a UFI interface. While the example of FIG. 6 specifies an A2F DATA channel, it should be appreciated that the following features and principles discussed in this example may apply equally to F2A DATA channels. Further, while the example of FIG. 6 is directed to a DATA channel, it should be appreciated that similar principles and operation may govern the other UFI channel types (RSP and REQ). Signals defined for inclusion in the DATA channel may include a clock signal 605, valid data signal 610 (e.g., A2F_data_is_valid), a data protocol ID signal 615 (e.g., A2F_dataprotocol_id), a data virtual channel ID signal 620 (e.g., A2F_data_vc_id), a shared credit signal 625 (e.g., A2F_data_shared_credit), a data header signal 630 (e.g., A2F_data_header), an end of packet signal 635 (e.g., A2F_data_eop), and a data payload signal 640 (e.g., A2F_data_payload), among other examples. Each of the signals (e.g., 605, 610, 615, 620, 625, 630, 635, 640) in the channel may be composed of a set of one or more physical lanes (e.g., enumerated consistent with the examples shown in Tables 6, 11, and 16 above).

In the particular example of FIG. 6, each signal wire may toggle between a low or high value once per clock cycle 605.

The valid data signal 610, when high, may indicate that valid data is to be sent. Accordingly, lanes of the data header signal 630 may be encoded with data to embody a header for corresponding payload data, such that the start of the sending of the header is aligned with the valid signal (e.g., at cycle x2). Values sent on the data protocol ID signal 615, VC ID signal 620, and shared credit signal 625 may also be aligned with the valid signal 610 and/or header, to identify the particular protocol (of potentially multiple protocols) applied to the header (e.g., CXL.mem) and its payload data, as well as the virtual channel (e.g., VC0) being used for the transmission and the credit type (e.g., shared or dedicated (per VC)) used by the header. When the shared credit signal 625 indicates that a dedicated credit is being used (e.g., when the signal 625 is low, or "0"), the aligned VC ID signal also identifies the VC ID of the dedicated credit. Depending on the size of the header and the width of the header signal, it may take multiple clock cycles (e.g., two cycles) to transmit the header. A portion, or "pump", of data (e.g., embodied as a single flit) may be sent on the multiple lanes within a single clock cycle. Likewise, payload data lanes 640 may be encoded with payload data, and the timing of the sending of the payload data may be based on the sending of a corresponding header.

In the example of FIG. 6, the channel may be configured such that there is no delay, or separation, between the beginning of the payload data (e.g., 648, 649) and the beginning of the corresponding header data (e.g., 644, 646). Accordingly, in such an example, the start of the payload data (e.g., payload pump 648) may be sent in alignment with the start of the header data (e.g., header pump 0 644). From the signals sent on the channel, a receiver may identify that the payload data is associated with the header, that the data is according to a CXL.mem protocol (based on the aligned protocol ID signal 615) and associated with virtual channel VC0 (based on the aligned virtual channel signal 620). The receiver may additionally identify, from the aligned shared credit signal 625 (and the VC ID signal) the nature of the credits being used by the header.

An end of packet signal 630 may be used to indicate when (e.g., in which flit or clock cycle) the last pump, or flit, of data for a given packet is being sent. For instance, in one implementation, when the value of the EOP Signal 630 is low, it may indicate that any payload data (and/or header data) being sent on the channel is not the last pump of data for the packet. However, when the EOP signal 630 is high, this may indicate that the pump of payload data (e.g., 650) is the last data in the packet, thereby indicating the end of one packet, such that subsequent data received on these signals (e.g., the payload and header signals) belongs to a different, subsequent packet. For instance, the EOP signal 635 is low in clock cycle x2 when the first pumps of the header 644 and payload 648 are being sent, but transitions to high in clock cycle x3 when the final pumps (e.g., 646, 650) are sent to indicate the end of the corresponding packet.

As further shown in the example of FIG. 6, a valid signal 610 may be utilized to interrupt transmission of a packet (and its corresponding data and header flits) on the channel. Indeed, valid might de-assert in the middle of a message, which pauses the transfer until valid is re-asserted. For instance, the EOP signal 635 may go low and the valid signal 610 high in clock cycle x5 to indicate the start of a new packet and corresponding header data (e.g., 656) on header signal 630 and payload data (e.g., 660) on payload signal 640. To simplify illustration of these principles, this next packet may also take two clock cycles, or flits, to transmit. However, rather than sending the two pumps of header and payload data (e.g., 656, 658 and 660, 662) in back-to-back clock cycles, the valid signal 610 may be brought low in clock cycle x6 to interrupt the transmission of the packet. The valid signal 610 may be brought back to high in the following cycle (clock cycle x7) allowing the last header pump 658 and payload pump 662 to be sent (along with data in the protocol ID 615, VD ID 620, and shared credit 625 signals which are to be aligned with each of the pumps (e.g., 656, 658) of the corresponding header sent on header signal 630. Additionally, the EOP signal 635 may be returned to high, in alignment with the sending of the last header pump 658 for the packet to indicate the end of the packet.

In addition to the channel data being sent over the channel (e.g., as payload data 648, 650, 660, 662, etc.), as discussed in more detail below, a flow of credit returns (of both shared and dedicated credits) may be received in the F2A direction for the corresponding channel. These credit returns may be wholly unrelated to the transaction(s) associated with the packets being sent concurrent in the A2F direction on the channel.

In some implementations, agents and the fabric (and other agents and components connected through the fabric) may share a clock. In other implementations, one or more agents may utilize a clock separate from the clock utilized by the fabric. Further, in some implementations, agents and fabric can be reset independently. The initialization flow ensures a synchronization handshake to make sure both the transmitter and receiver are ready before packet transfers begin. While the UFI interface is synchronous, it allows the placement of clock crossing queues (e.g., first in first out (FIFO)) at the receivers. To accommodate issues with FIFO back pressure due to clock crossing (and corresponding clock crossing FIFOs), UFI may define blocking signals (e.g., *_block and *_txblock_crd_flow), which may be opportunistically asserted by receivers to potentially pause, or block, injection of additional messages. UFI may further enable configuration of blocking signals to configurable adjust delays between the assertion of a blocking signal and the actual blocking of message injections. For instance, blocking signals may be configured to meet timing requirements at the transmitter to allow for injection of messages to be blocked for a configured number of clock cycles (e.g., one to three clocks). In implementations where no clock crossings exist, blocking signals may not be used and are permitted to be tied off (e.g., to 0). In some implementations, initialization signals support clock differences through simple synchronizers and make no assumptions about clock ratios, among other example features and implementations.

Figure 7:
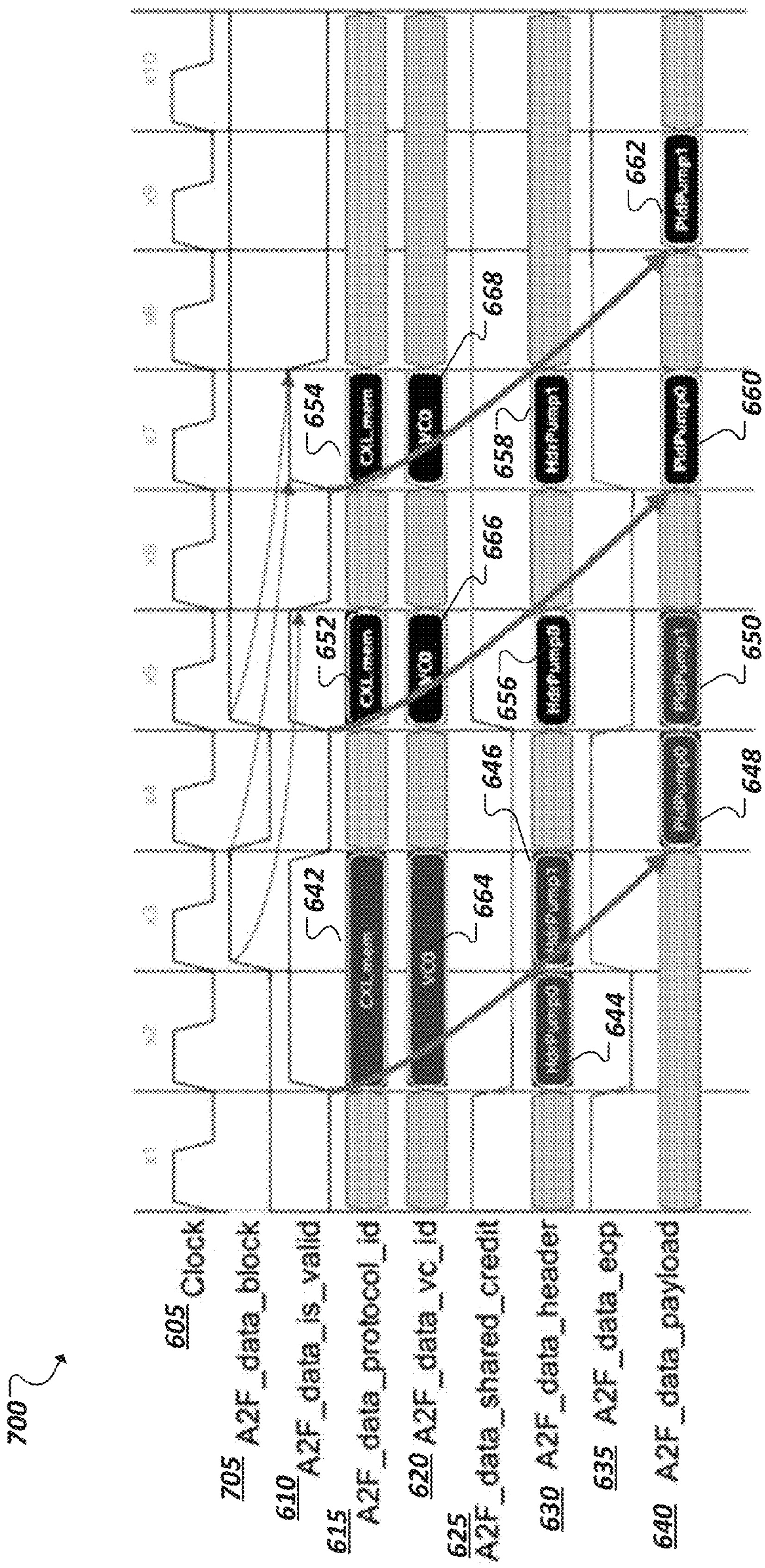
FIG. 7 is a timing diagram illustrating signaling over a channel of an example flexible on-die fabric interface including use of a blocking signal.

Turning to the timing diagram 700 of FIG. 7, an alternative implementation of the example of FIG. 6 is presented for illustrative purposes, to indicate the effect of blocking signals (e.g., 705) on the channel, as well as configuration of a header-to-payload separation parameter to a non-zero value. In some implementations of UFI, the sending of a blocking signal (from the receiver to the sender on the channel) may force the sender to de-assert the valid signal and cause a stall or interruption in the sending of a packet or message (such as shown in the example of FIG. 6). The sending of a blocking signal 705 from the receiver may not immediately cause the valid signal to be de-asserted, instead, a parameter may be configured to define a rule by which the transmitter is to de-assert the valid a defined (non-zero) number of clock cycles after the sending of the blocking signal. For instance, in the example of FIG. 7, the receipt of a blocking signal 705 (e.g., at clock cycle x3) is to force the de-assertion of valid 705 three clock cycles later (based on a configured value), such that the valid signal 705 is brought low at clock cycle at x6. As also illustrated in FIG. 7, the blocking signal may be asserted for multiple consecutive cycles (e.g., at clock cycles x5-x10) causing a corresponding stall based on the associated de-assertion of the valid signal again three cycles later (e.g., from clock cycle x8 until three clock cycles following the de-assertion of the blocking signal 705 (not shown)). The result is the sending of header pumps 644, 646, 656, 658 with a timing matching that in the example of FIG. 6.

As a contra example to that of FIG. 6, FIG. 7 shows the use of a non-zero payload offset parameter. For instance, a data header separation parameter (e.g., A2F_DataHdrSep) may be configured to provide a desired offset from the start of the header to the start of corresponding payload. In the example of FIG. 7, the data header separation parameter is set to a two-clock-cycle separation, such that each payload pump is sent two clock cycles following a high valid signal 610 (which the corresponding header pumps (e.g., 644, 646, 656, 658) are aligned with. While the examples shown in FIGS. 6 and 7 show a correlation between the number of cycles used to transmit a header and the number of cycles used to transmit a corresponding payload, it should be appreciated that in some implementations, it may take more clock cycles to transmit the payload than the header. In such cases, the payload pumps (or flits) may be sent without corresponding header pumps. In other implementations, a copy of the header may be sent to correspond with each associated payload pump, among other example implementations.

For instance, in FIG. 7, valid may be asserted at clock cycles x2 and x3, resulting in header pumps 644, 646 (and corresponding values in the protocol ID 615, VC ID 620, and shared credit 625 signals) also being sent in the same clock cycles. Further, based on the two-cycle data header separation parameter, the sending of the payload data (e.g., pumps 648, 650) associated with the header (e.g., pumps 644, 646) may be delayed two cycles from the assertion of valid at cycles x2 and x3, such that the associated payload data pumps (e.g., 648, 650) are sent in cycles x4 and x5. This delay, in some cases, may result in the payload data (e.g., 650) of a preceding packet being sent in the same cycle as header data (e.g., 656) of a subsequent packet, such as in the example of FIG. 7. This same delay may be applied to payload data of all subsequent packets on the channel (e.g., the payload pumps 660, 662 corresponding to the header pumps 656, 658 sent in alignment with the valid assertions at clock cycles x5 and x7), among other examples.

The examples of FIGS. 6 and 7 should be appreciated as non-limiting, simplified illustrative examples shown and described here for purposes of illustrating corresponding general principles of UFI interfaces. Indeed, principles and features shown in FIGS. 6 and 7 as applying to a UFI DATA channel may be equally applied to other UFI channels, and specifically to at least some of the signals in the UFI REQ and RSP channels. For instance, in REQ and RSP channels, a respective valid signal may be included and asserted to align with a corresponding header signal (e.g., REQ HDR or RSP HDR), as well as corresponding flow control and protocol identifier signals provided on the respective channel. The REQ and RSP channels may also include respective blocking signals to allow a receiver to stall messages on the channel (e.g., to attempt to relieve FIFO backpressure). Likewise, receiver-to-transmitter directed credit return channels (for both dedicated and shared credits for that channel) may be provided to allow such credit returns to take place in parallel with packets and messages sent on the channel, among other example features.

Figure 8:
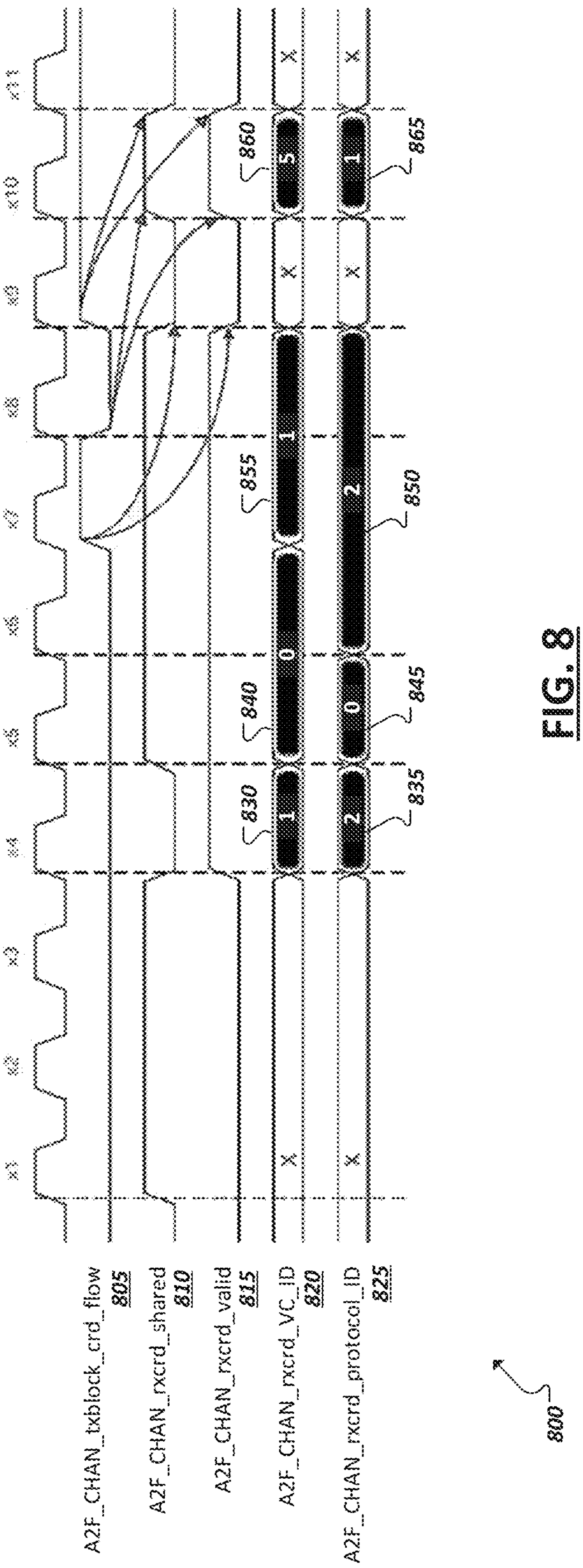
FIG. 8 is a timing diagram illustrating credit return signaling over a channel of an example flexible on-die fabric interface.

FIG. 8 illustrates a timing diagram 800 showing a simplified example of credit returns over a channel of an example UFI interface. For instance, each physical channel may include a credit return interface from the receiver. In this section, CHAN refers to an abstraction of one of the particular physical channels (REQ, DATA, RSP). For instance, the channel may include a blocking signal (e.g., 805) for the credit returns (and function similar to the blocking function discussed in the example of FIG. 7), a shared credit return signal 810, a credit return valid signal 815 (which may function similar to the valid signal discussed in the examples of FIGS. 6 and 7), a VC ID signal 820 (to identify the virtual channel to which dedicated credit returns are to apply) and a protocol ID signal 825 for the credit returns, among other example signals. Such credit return signal may be in accordance with the examples discussed in Tables 6, 11, and 16 above.

In the example of FIG. 8, in an implementation of a UFI interface, when the *CHAN_rxcrd_shared signal is asserted 810, it indicates that a shared credit is being returned. The assertion of the *CHAN_rxcrd_valid signal 815 indicates a dedicated credit is being returned. Shared credits and dedicated credits can be returned concurrently in parallel over the credit return interface of the channel. The *CHAN_rxcrd_VC_ID 820 indicates the VC ID of the returned dedicated credits, while the *CHAN_rxcrd_protocol_ID signal 825 identifies the protocol (in instances where multiple protocols are supported on the channel) of the returned dedicated credits. In the example of FIG. 8, during clock cycles x1 to x3, shared credits are returned as indicated by the assertion of *CHAN_rxcred_shared 810. During clock cycle x4, only dedicated credits are being returned as indicated by the assertion of *CHAN_rxcrd_valid 815 (for VC 1 in protocol 2). From clock cycles x5 to x8 both shared and dedicated credits are being returned with both *CHAN_rxcrd_shared 810 and *CHAN_rxcrd_valid 815 being asserted.

As further illustrated in FIG. 8, a block signal may be applied in some implementations of credit return signal sets in a UFI interface, to allow the receiver to pause or stall the flow of credit returns. For instance, in clock cycle x7, the blocking signal, *CHAN_Txblock_crd flow 805 is asserted, which causes credits to stop being returned a number of clock cycles after the assertion of the blocking signal 805. The number of cycles may be defined according to a configurable parameter. For instance, in the example of FIG. 8, the parameter is set to 2 cycles, causing the credit returns to stop in cycle x9 as indicated by de-assertion of both *CHAN_rxcrd_shared 810 and *CHAN_rxcrd_valid 815. When the blocking signal 805 is de-asserted (e.g., at clock cycle x8) credit returns allowed to continue (e.g., two cycles later in association with the configured parameter). Continuing with the example of FIG. 8, at clock cycle x9 the blocking signal 805 is re-asserted resulting again in a pause in the credit returns beginning 2 cycles later, among other example embodiments.

In some implementations, to facilitate the maintenance of credit returns and accounting, the transmitter side of a link may include a credit counter (e.g., an 8-bit credit counter) for each supported credit type (both shared and dedicated types). Accordingly, the receive side of the link that returns credits are to return credits in accordance with the granularity of the credit counter (e.g., no more than can fit into a corresponding 8-bit counter (e.g., 255 credits)), among other features.

As discussed herein, in some implementation of UFI, corresponding virtual channels (VCs) and virtual networks (VNs) may both separate messages into further flow control classes beyond the baseline channel definition. The baseline channel flow control provides a non-blocking flow control for each class of traffic within each protocol. While some instances may provide for multiple virtual channels and traffic classes for a protocol, in other implementations and applications (and corresponding protocols (e.g., CXL.cache and CXL.mem)) only a single virtual channel may be provided per physical channel per direction. Additional fields may be provided in some implementations of UFI to assist with Quality-of-Service metrics and/or enforcement, among other example features.

In some implementations, agents may advertise only shared credits (e.g., for VC IDS), which are guaranteed to sink without dependence (including network layer dependence). This can be done to avoid the need for dedicated, per VC_ID credits. The RSP channels for protocol agents are an example where this is possible, for instance, where there is a pre-allocated tracking structure that can absorb the response.

Error handling for illegal flow-control cases may result in undefined behavior. Accordingly, agents and fabric components may be equipped with logic to check for illegal cases that trigger assertions in the register transfer logic (RTL) and may additionally log error events or send signals to indicate fatal errors to allow for debug or remediation. Such error conditions, which may be detected include assertion of an end or packet (EOP) signal when the packet is not completed (e.g., in a 2-FLIT message encoding, but where the EOP is set on first FLIT), receive queue overflows, clock crossing FIFO overflow conditions, among other examples.

In some implementations, a state machine or other logic may be provided on agent and fabric devices to participate in defined connect and disconnect flows for a UFI. For instance, such flows may be invoked during boot/reset and when going into a low power mode, among other example states or events. In some implementations, UFI defines an initialization phase where information about credit availability in the receiver (RX) is communicated to the transmitter (TX) after a connection is established. In some instances, reset can independently de-assert between the agent and fabric sides of UFI. For independent reset, the initialization signals may be driven (e.g., on the Global channel) to the disconnected condition when in reset and no traffic may be sent until initialization reaches the connected state. The disconnect flow may be additionally supported by agents, for instance, to reconfigure credits and achieve power saving. Without this flow, all CPI credits may be configured to a final value before the first connection can proceed.

Figure 9:
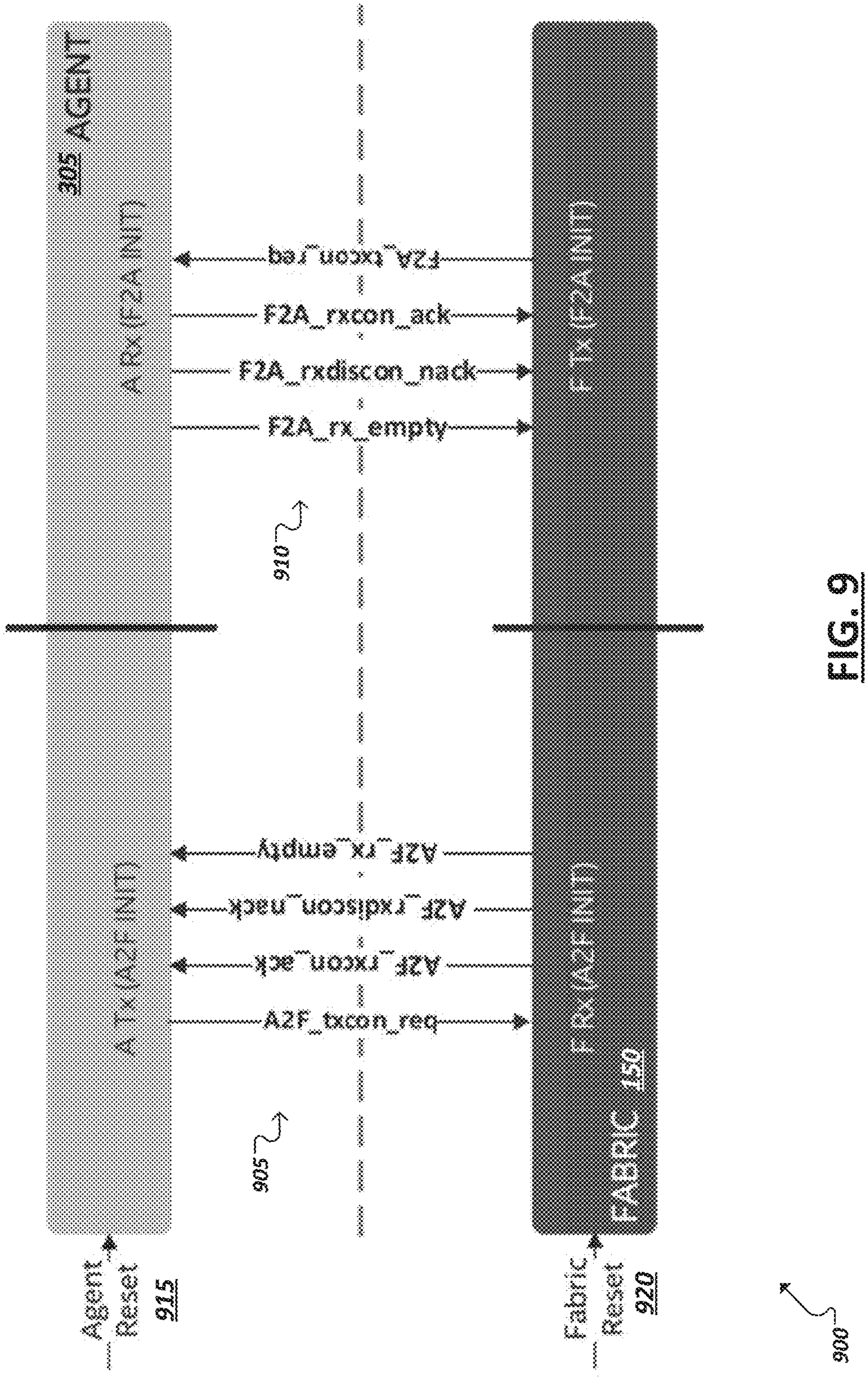
FIG. 9 is a simplified block diagram illustrating a portion of a global channel of an example flexible on-die fabric interface.

Connections within UFI may be separated in the A2F and F2A directions. The signaling for connection is in the initialization Global physical channel of the UFI interface coupling an agent 305 to fabric 150 of a system. For instance, FIG. 9 illustrates an example of a Global channel of a UFI interface, including signal sets 905, 910 for use in initializing the UFI interface. For instance, an A2F initialization signal set 905 and F2A initialization signal set 910 may be provided. Reset signals (e.g., 915, 920) may additionally be defined at the agent and fabric level which allow a software or hardware controller to initiate reset of the agent 305 and/or fabric 140. Each of the A2F and F2A global signal sets may include a transmitter connection request (txcon_req) signal, a receiver connection acknowledge (rxcon ack signal), and a receiver disconnect NACK (rxdiscon_nack) signal. This set of three signals (e.g., txcon_req signal, rxcon ack signal, and rxdiscon_nack) may define the initialization states and cause transitions between these states. In some instances, the global initialization signal sets 905, 910 may also include a rx_empty signal to identify that receiver queues are empty for all channels and that credits have been returned, among other example signals.

In initializations, the agent and fabric sides of a UFI interface may be brought out of reset close to or at the same time. One end of the interface (e.g., after coming out of reset) may not have implicit requirements for when the other end should come out of reset. In some implementations, UFI may define an explicit handshake during initialization between the agent and fabric to ensures that both endpoints (and all pipeline stages between them) are out of reset before any credits or transactions are sent on the UFI interface. Accordingly, after reset, the receiver may begin sending credits for dedicated VC buffers and shared buffers. In some implementations, UFI may support blocking signals to be sent by the transmitter during runtime for credit returns.

Figure 10:
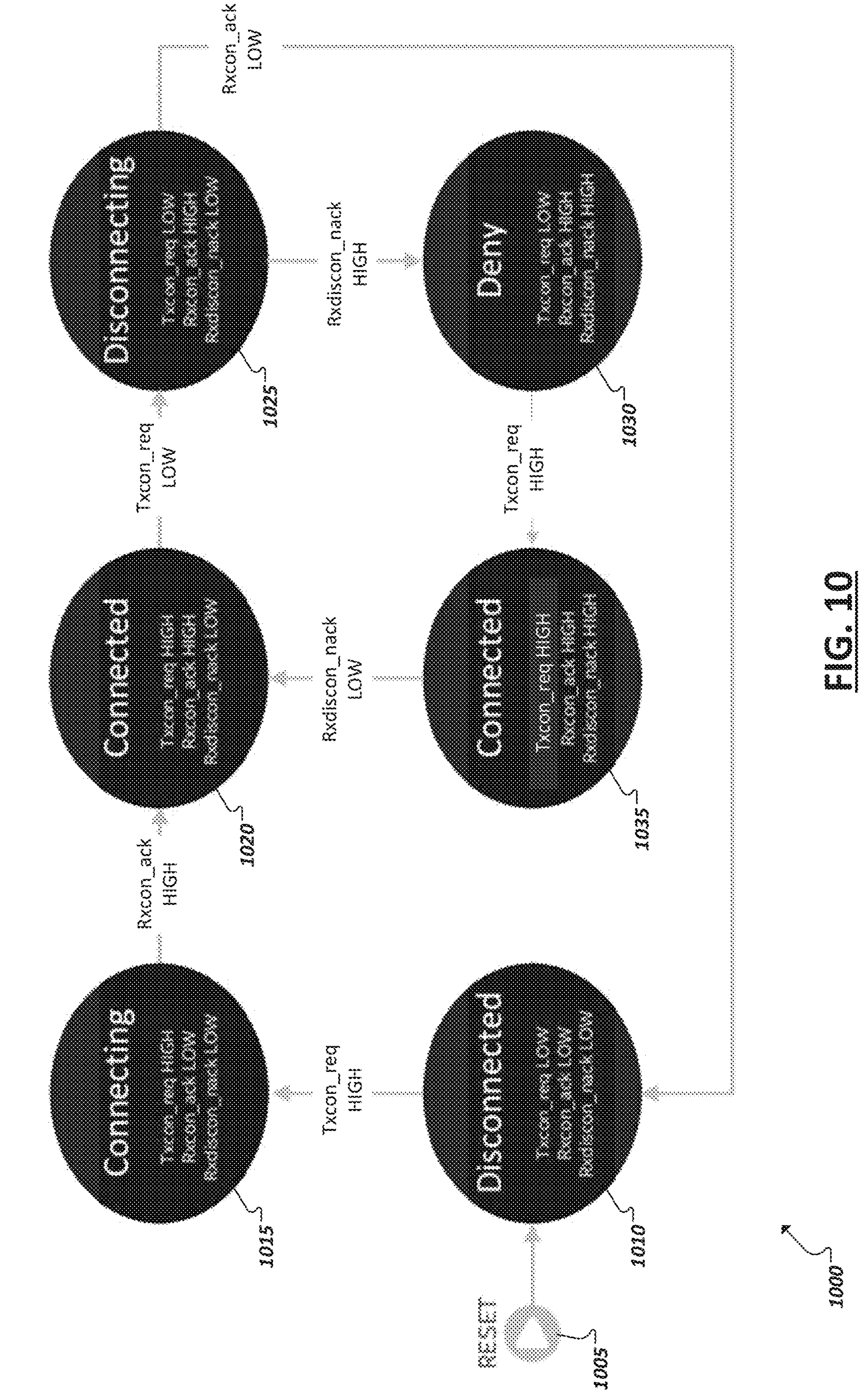
FIG. 10 is a diagram illustrating an example initialization state machine for an example flexible on-die fabric interface.

FIG. 10 is a diagram 1000 illustrating an example state machine for initialization states in an example implementation of UFI. States may include a Disconnected state 1010 (which may be entered based on a reset 1005), a Connecting state 1015, a Connected state (1020, 1035), a Disconnecting state 1025, and a Deny state 1030. The combinations of values of the txcon_req signal, rxcon ack signal, and rxdiscon_nack signals may indicate a respective initialization state. As an example, in the Disconnecting state 1025, the txcon_req signal may be LOW, the rxcon ack signal may be HIGH, and the rxdiscon_nack may be LOW. Changing a particular one of the signal values may cause a transition from one initialization state to another. For instance, wherein the Disconnecting state 1025, changing the rxcon ack signal from HIGH to LOW may cause a transition to the Disconnected state 1010, while changing the rxdiscon_nack signal from LOW to HIGH may cause a transition to the Deny state 1030, among other example as illustrated in the state machine example of FIG. 10. In a UFI interface, respective initialization states are used to determine actions to be performed by the receiver and transmitter, such as the example actions described in Table 21 below.

TABLE 21

Initialization State Actions

| txcon_req | rxcon ack | rxdiscon_nack | State | Tx Actions | Rx Actions |
|---|---|---|---|---|---|
| 1 | 0 | 0 | Connection request (Connecting) | Sink Credits Do NOT Send Packets | Do NOT send Credits; Do NOT sink Packets |
| 1 | 1 | 0/1 | Connected | Sink Credits Send Packets | Send Credits Sink Packets |
| 0 | 1 | 0 | Disconnection request (Disconnecting) | Sink Credits Do NOT Send Packets | |
| 0 | 1 | 1 | Deny (Disconnect Rejected) and must go back to connected | | |
| 0 | 0 | 0 | Disconnected | Drop Credits Do NOT Send Packets | Do NOT Send Credits Do NOT Sink Packets |
| 1/0 | 0 | 1 | Illegal States | n/a | n/a |

Signaling rules may be defined for a Global initialization signal set. In one example, the txcon_req signal may be defined such that a transition from 0 to 1 reflects a connection request and a transition from 1 to 0 reflects a disconnection request. Credit return signals may be provided, for instance, with a credit valid (crd_valid) signal and a credit shared (crd_shared) signal. In one example, crd_valid=1 may be defined to mean it is releasing the dedicated message credits for a protocol ID and a virtual channel ID, while crd_shared=1 means it is releasing a shared credit (which can happen in parallel with a dedicated message credit return). In some implementations, a credit return behaves in the same way during the first initialization of credits as it does during runtime return of credits. The rx_empty signal indicates all channel credits returned from the receiver and all receiver queues are empty (although this may not account for messages that are in flight or in intermediate buffers such as clock crossing queues, among other example issues). In some implementations, a transmitter may check rx_empty before initiating a disconnect. By checking, it increases the probability that the disconnect is quickly accepted (e.g., in absence of possible in-flight requests that have not yet registered in at the receiver). In some implementations, to further increase the probability of disconnect acceptance, the transmitter may implement a timer delay after the last valid message sent such that the receiver pipeline would have time to drain into the receiver queues, among other example features. In some implementations, during initialization, the transmitter sends messages as soon as any credits are available and not depend on a rx_empty assertion. Alternatively, a transmitter may stall the sending of any packets after initialization until rx_empty is asserted, the transmitter can use the credits received as an indication of the total credits a receiver has advertised.

In an example implementation of a UFI interface, a transmitter can send packets when it receives a sufficient number of credits for a message on any given physical channel. Sending also depends on having the correct credit, where shared credits can be used by any message and dedicated credits are to only be used by messages of a single VC and protocol combination. In some implementations, the receiver may stall the credit release for N cycles after a CHAN_txblock_crd_flow is asserted. A configurable AgentBlocking parameter defines the value of N cycles. A delay of N cycles occurs between txblock_crd_flow state change until crd_valid and crd_shared signals reflect the corresponding block or unblock. Such blocking signals may be used, for instance, in instances of clock crossing of credit returns, for instance, where the txblock_crd_flow is asserted if the free entries in the clock crossing FIFO are N. In implementations, where clock crossing is not an issue, the txblock_crd_flow signal can be tied to 0, among other example implementations.

As further examples of signaling rules, which may be defined in a UFI implementations, connection ACKs may be defined to always follows connection requests. As noted above, a connection request may be signaled by txcon_req transitioning from 0→1. This transition serves as an indication that the transmitter is ready to receive credits and is in normal operation. An ACK may be signaled by rxcon ack transitioning from 0→1. An ACK may be stalled for an arbitrary time until a receiver is ready to complete. Similarly, disconnect ACKs or NACKs may be defined to follow disconnect requests. A disconnect request may be is signaled by a txcon_req transition from 1→0. A disconnect ACK may be signaled by an rxcon_ack transition from 1→0. A disconnect NACK may be signaled by an rxdiscon_nack transitioning from 0→1. A rule may be defined to require a receiver to either respond with an ACK or NACK to each disconnect request it receives, among other example policies and implementations.

Figure 11:
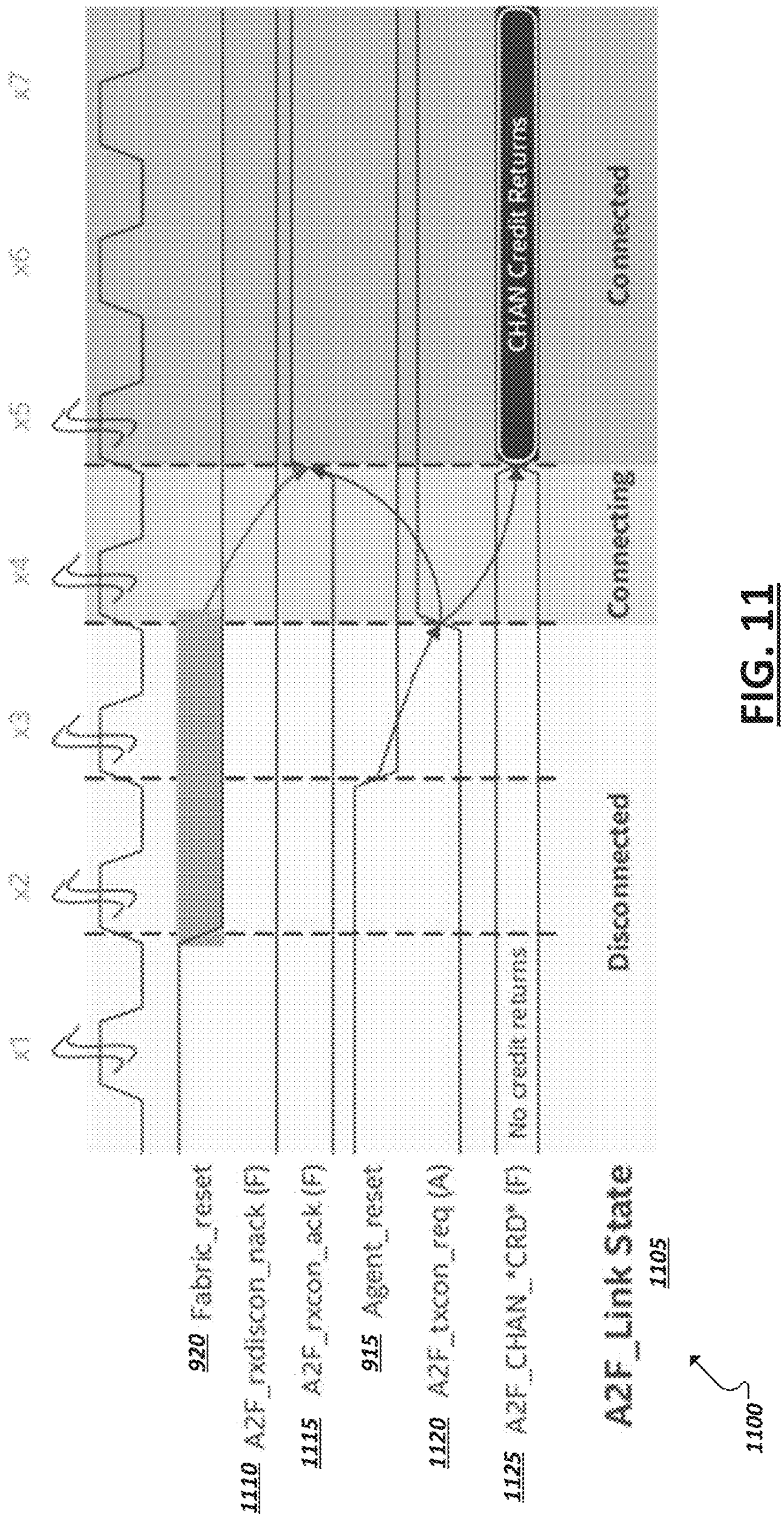
FIG. 11 is a timing diagram illustrating initialization of an example flexible on-die fabric interface.
Figure 12:
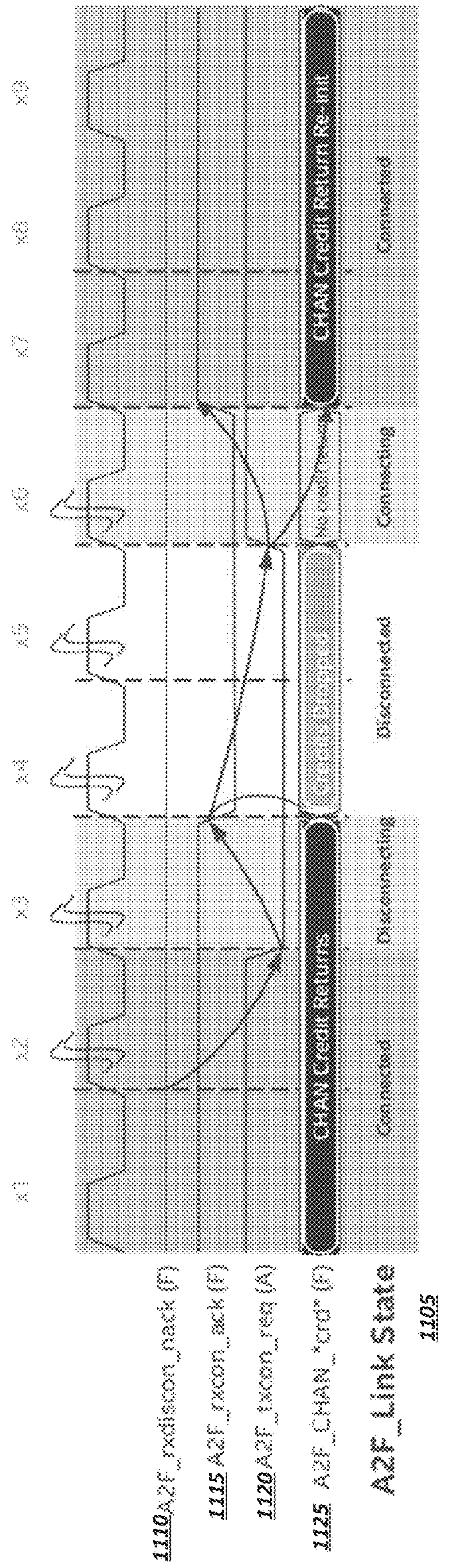
FIG. 12 is a timing diagram illustrating a first example of a disconnect flow in an example flexible on-die fabric interface.

Turning to FIG. 11, an example timing diagram 1100 is illustrated for initialization of a UFI interface from a Reset to a Connected state. In the particular example illustrated in FIG. 11, an example A2F initialization flow is illustrated utilizing initialization signals in a Global channel of the UFI interface. It should be appreciated that a corresponding (e.g., mirror) of the A2F flow may be implemented with opposite drivers in the F2A direction. As shown in FIG. 11, the initialization signal set may include a receiver disconnection NACK signal 1110, a receiver connection ACK signal 1115, and a transmitter connection request signal 1120. Additional signals are shown to illustrate certain features, including an agent reset signal 915 (to cause the agent to enter a reset condition), a fabric reset signal 920 (to cause the fabric to enter a reset condition). Also illustrated is a representation of at least one of the UFI channels' credit return signal set 1125 (e.g., the credits signal set for one or more of the REQ, DATA, and RSP channels). In the illustrations of FIGS. 11 and 12, an "F" after the signal name represents the fabric as the driver of the signal and "A" denotes the agent as the driver of the signal.

To enter a connected state, once the transmitter is out of reset (e.g., corresponding reset signals (e.g., 915, 920), it may assert the txcon_req signal 1120 to identify the request to the receiver. Similarly, when the receiver is out of reset, it waits for a connection request on the txcon_req signal 1120. The assertion of the connection request can be an arbitrary number of cycles after the reset (e.g., 915) asserts. Until the connection is complete, the txcon_req signal 1120 is to remain asserted and is to only de-assert as part of the disconnect flow. Upon receiving a connection request on the txcon_req signal 1120, the receiver may assert the rxcon_ack signal 1115 to acknowledge the request. The rxcon_ack signal 1115 may be asserted after both the reset (e.g., fabric reset 920) and the txcon_req signal 1120 are asserted. The rxcon_ack signal 1115 is to remain asserted and is to be first de-asserted only in a disconnect flow.

This sequence may allow the initialization link state 1105 to progress from a Disconnected to a Connecting to the Connected state. Upon entering the Connected state (and sending the rxcon_ack signal) the receiver may immediately begin returning credits (e.g., on credit return wires 1125. Indeed, the receiver may start to return credits simultaneously with the assertion of rxcon_ack signal 1115. Accordingly, the transmitter (e.g., the agent) is prepared to accept credit returns upon asserting the txcon_req signal 1120 (e.g., at clock cycle x4), for instance, because credit returns might be observed before observation of A2F rxcon_ack due to intermediate buffering or clock crossings. After the minimum credits are received to send packets, the transmitter can start sending packets or messages over the channel. The reconnect flow may be implemented similar to the connect from reset flow discussed herein, however, to start a new credit initialization, the receiver will first reset its credit counters to reset values and the transmitter is to reset its credits available counters to zero, among other example implementations.

Turning to FIG. 12, an example timing diagram 1200 is shown illustrating an example disconnect and reconnect flow for an example UFI interface. In this example, the transmitter may de-assert the txcon_req signal 1120 to facilitate a disconnect at time x3. In some implementations, to allow the disconnect to progress, the rxdiscon_nack signal 1110 is to be de-asserted before txcon_req signal 1120 is de-asserted. When a disconnect is requested, the transmitter is to no longer be sending messages on any channel (e.g., indicated by CHAN is valid bit assertion). Based on the initiation of a disconnect flow by the transmitter, the receiver is to decide whether to acknowledge (ACK) or negatively acknowledge (NACK or reject) the disconnect. To acknowledge the disconnect, the receiver may de-asserts the rxcon_ack signal 1115 after ensuring all pipelines are empty (e.g., at clock cycle x4), which marks the entry into a disconnected state (as reflected by link state indicator 1105). In some instances, the receiver may can also ensure that all credits have been returned.

Figure 13:
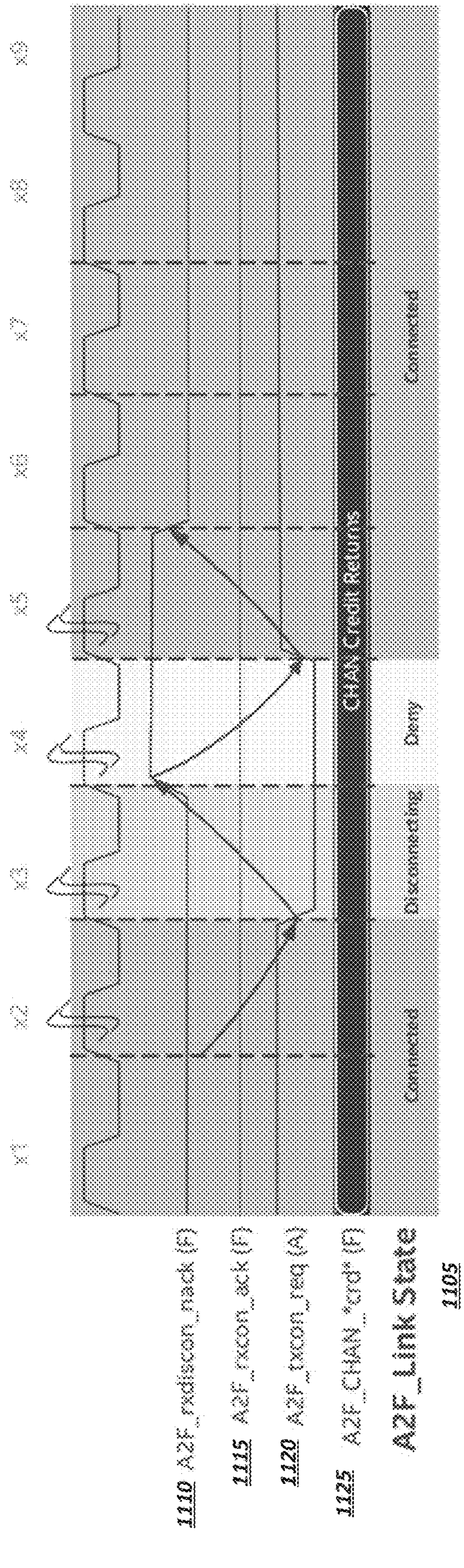
FIG. 13 is a timing diagram illustrating a second example of a disconnect flow in an example flexible on-die fabric interface.

While the diagram 1200 of FIG. 12 illustrates an instance where a disconnect request was positively acknowledged by the receiver, FIG. 13 illustrates a contrary example where the receiver responds with a negative acknowledgement (or NACK). For instance, to send a negative acknowledgment, the receiver may instead assert the rxdiscon_nack signal 1110 (e.g., at clock cycle x4). For instance, the negative acknowledgement may be selected if the receiver determines that it is unable to drain its pipelines without risking deadlock, among other example reasons. After the NACK, the transmitter may reassert the txcon_req signal 1120 (e.g., at clock cycle x5). Upon observance of this effective acknowledgment by the transmitter of the receiver's NACK, the rxdiscon_nack signal 1110 can be de-asserted (e.g., as shown at clock cycle x6 in the example of FIG. 13).

In some implementations, the connect and disconnect flows are expected to complete within a few microseconds after initiation. In some implementations, a timeout may be defined, explicitly or implicitly. For instance, a receiver may be configured to reply with an ACK or NACK within a defined or recommended window of time. For instance, the agent, fabric, or system (e.g., SoC) can define a timeout or time window to enforce this expectation.

In some instances, an agent or fabric element may reset while the UFI interface is in a connected state, resulting in a surprise reset. For instance, the defined or recommended flow may be to enter Disconnect before Reset. As one example, a rxcon_ack signal may transition 1→0 occurs because of a surprise reset on receiver side of the link while value of the transmitter's txcon_req signal is 1. In such a case, the transmitter may force itself to a disconnected state and restart initialization. If this happens when the transmitter is in an idle state, it can recover without loss of messages. As another example of a surprise reset, if the txcon_req signal transitions 1→0 because of a surprise reset on the transmitter side of the link while the rxcon_ack is 1, the standard disconnect flow may be followed. If this happens when Rx is in an idle state, disconnect should receive Ack and cleanly reach a disconnected state provided Tx stays in reset. If the disconnect is Denied (NACK) by the receiver, however, a fatal or illegal link state may result (e.g., an unrecoverable error). In cases of surprise resets, if traffic is active (e.g., not idle), a loss of protocol messages can result and may be fatal to continued normal operation.

As discussed above, a UFI interface in a system may be configurable according to a variety of parameters. For instance, a set of parameters may be specifically defined in accordance with the use case, features, protocols, and topology of a given system, such as a particular SoC design. Such parameters may define, for instance, the protocols that are to be carried and supported over the interface, the size of headers (and thus the width of the corresponding channels), separations between header and payload data, delays between blocking signals and blocked injection of messages and/or credit flow, timeout windows, and other example parameters. In some implementations, parameters may be defined on a per physical-channel-basis. In other cases, parameters may be defined for the entire UFI interface instance (e.g., where a parameter applies to all of the channels of the interface), among other examples. Parameters values may be defined and saved, for instance, in a configuration register or other data structure for use and reference by the agent and fabric components connected through the interface. Table 22 presents an example of parameters, which may be set in one example of a CPI implementation of a UFI interface.

signals of the request, data, and response channels of the UFI, among other examples and alternative use cases and implementations.

Figure 14A:
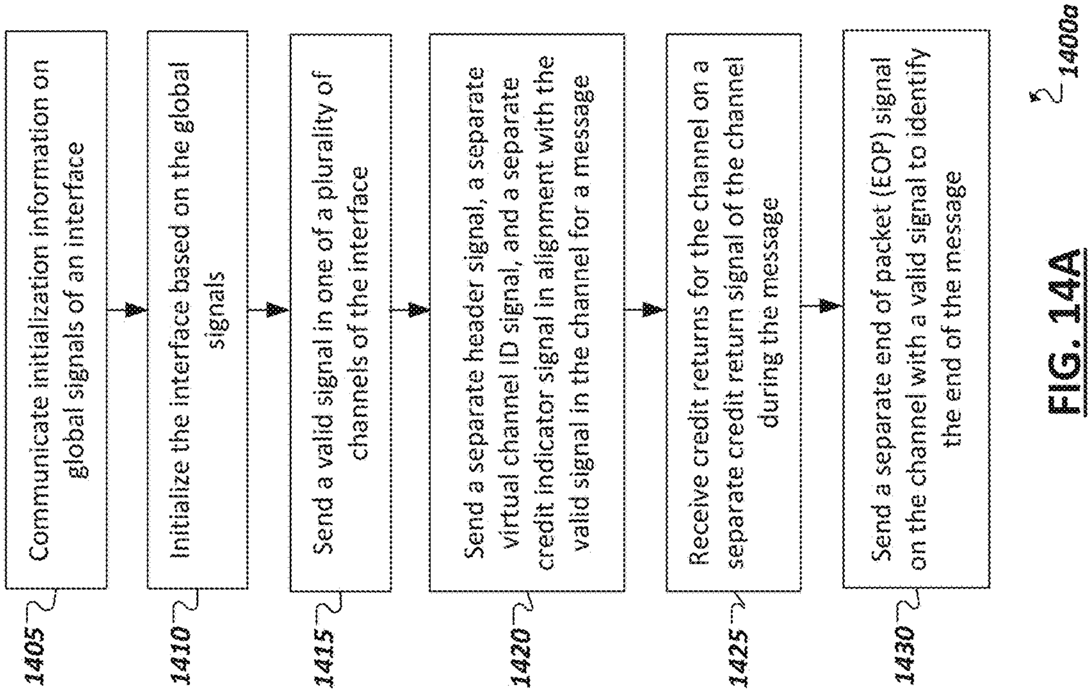
FIGS. 14A-14B are flow diagrams illustrating example techniques for signaling using an example flexible on-die fabric interface.
Figure 14B:
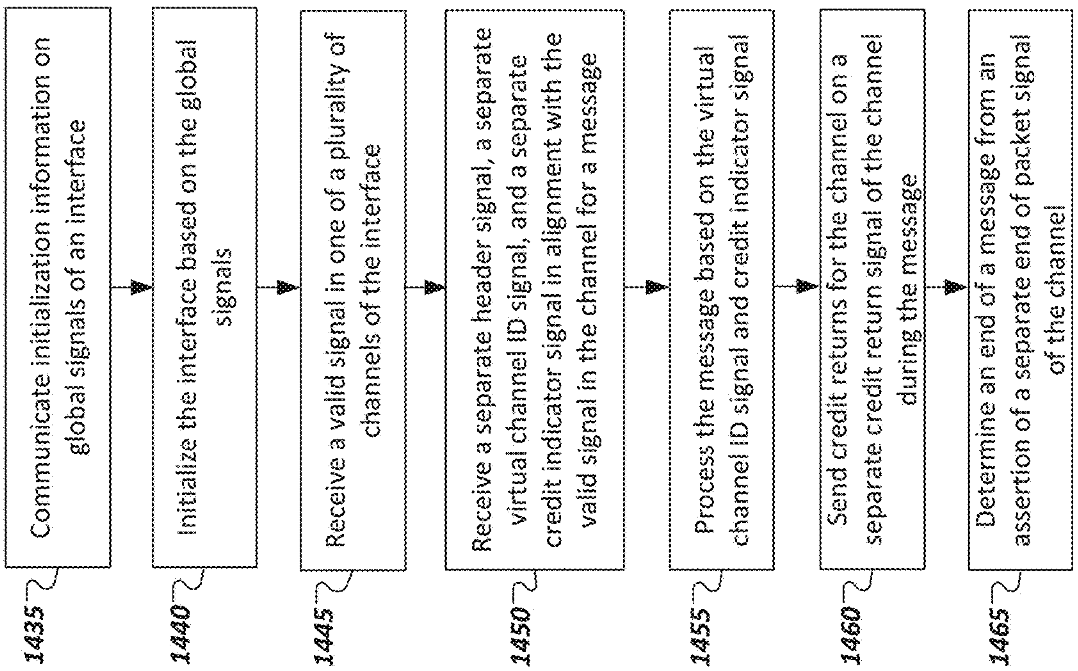

Turning to FIGS. 14A-14B, simplified flowcharts 1400*a-b* are shown illustrating example techniques for using a UFI interface, such as discussed in the example implementations herein. For instance, in the example of FIG. 14A, a transmitter side of a UFI interface may be composed of lanes assigned to respective signals in a set of signals to send a message to a receiver in a particular one of the plurality of channels of the interface (e.g., REQ, RSP, or DATA), as well as lanes assigned to signals to be received from the receiver of the message. A global channel may include multiple lanes to send and receive respective signals to control aspects of the interface, including the initialization of the interface. Indeed, initialization signals may be communicated 1405 on the interface to initialize 1410 the interface for the sending of messages on any one of the channels (e.g., REQ, RSP, or DATA). To send a message on the channel, a valid signal may be sent 1415 on a dedicated set of one or more lanes of the channel and corresponding header signal, VC_ID signal, and credit type signal (e.g., shared or dedicated) may be sent in alignment with the asserted valid signal (e.g., to indicate that these signals carry valid information). On the same channel, credit returns may be received by the sender of the message (e.g., a request, no-data response, or data transfer) concurrently with the sending of the message on separate credit return lanes (assigned to a set of credit return signals)

TABLE 22

| Parameters Supported | |
|---|---|
| **Parameter** | **Description** |
| Prot_UP_CXL_CACHE | If 1, Upstream Port CXL.Cache protocol supported |
| Prot_DP_CXL_CACHE | If 1, Downstream Port CXL.Cache protocol supported |
| Prot_UP_CXL_MEM | If 1, Upstream Port CXL.Mem protocol supported |
| Prot_DP_CXL_MEM | If 1, Downstream Port CXL.Mem protocol supported |
| A2F_DataHdrSep[2:0]<br>F2A_DataHdrSep[2:0] | Defines the separation between header and payload fields on the DATA physical channel. Applies to all protocols on an interface. For instance, the parameter value may identify the number of clock cycles of separation between the header and the corresponding payload field:<br>0x0 = 0 cycle separation<br>0x1 = 1 cycle separation<br>0x2 = 2 cycle separation<br>0x3 = 3 cycle separation<br>0xN = N cycle separation<br>This value is independent for A2F and F2A directions. |
| AgentBlocking [1:0] | Agents that require support for the block signal to stop traffic for the channel or credit return use this parameter to define the block behavior.<br>The reaction time of the block signal is dependent on the fabric's reaction time, meaning that time from the block asserted until Valid is guaranteed to be de-asserted.<br>Example values may include:<br>0x0 - No Blocking<br>0x1- Blocking is enabled with a response time of 1 cycle<br>0x2 - Blocking is enabled with a response time of 2 cycles<br>0x3 - Blocking is enabled with a response time of 3 cycles |
| FabricBlocking [1:0] | Same definition as AgentBlocking, but applies to traffic going to the fabric, where fabric can assert a block signal. When enabled, this parameter defines the reaction time of the agent to a fabric block. |
| DataCmdParity | If 1, data_cmd_parity field is supported on the DATA channel. |

It should be emphasized, that while many examples above describe a UFI supporting CXL-based protocols, that the UFI is not so limited, and may be configured to support potentially any coherent interconnect protocol, with corresponding headers of these protocols mapped to header on the channel. When the message is completed, an end of packet signal may be sent (on separate lanes) to identify the final pumps, flits, or other quantum of data corresponding to the end of the message data (and allowing for the sending of a next message on the channel).

In the example of FIG. 14B, techniques are illustrated associated with a receive side of a channel (e.g., REQ, DATA, RSP) of a UFI interface (e.g., the receive side of the same channel as the transmit side discussed in the example of FIG. 14B). For instance, a global channel may also be provided on the receive side to communicate 1435 initialization signals to initialize 1440 the interface. After initialization, a valid signal may be received 1445 on valid signal lanes of the channel and a corresponding header signal, VC_ID signal, and credit type signal may be received 1450 on corresponding, distinct lanes of the channel. These signals may be received 1450 in alignment with the valid signal to identify that the valid signal applies to these signals. A message may be received on the channel through these signals and the message may be processed 1455 based on information in the collective signals (as well as other signals, such as a protocol ID signal, which identifies one of a plurality of protocols that is to apply to the header and the remainder of the message). For instance, the credit used for the message may be identified in the credit type signal and the VC_ID signal (which may also identify the virtual channel to be applied to the message), among other examples. Credit returns may be sent 1460 for the channel on dedicated lanes of the channel during receipt of messages on the channels. Other signals may also be sent, such as blocking signals to stall message data on the channel, among other examples. An end of a message may be determined 1465 based on an assertion of an end of packet signal on another dedicated lane of the interface (e.g., when the EOP signal is sent in a same clock cycle as a valid signal). Upon determining the end of the message, subsequent messages may be received and identified on the channel. The flows in the examples of FIGS. 14A-14B may be common across each of the interface channels (e.g., REQ, DATA, and RSP) in both the A2F and F2A (or transmit/receive, upstream/downstream) directions. Some channels (e.g., the DATA channel) may possess additional or different signals based on the functionality of the channel beyond these common or similar signal sets of the channels, among other example implementations.

Note that the apparatus', methods', and systems described above may be implemented in any electronic device or system as aforementioned. As specific illustrations, the figures below provide exemplary systems (e.g., SoCs, computing blocks, fabric blocks, etc.) for utilizing the solutions described herein. As the systems below are described in more detail, a number of different interconnects, use cases, topologies, and applications are disclosed, described, and revisited from the discussion above. And as is readily apparent, the advances described above may be applied to any of those interconnects, fabrics, or architectures and their composite components.

Figure 15:
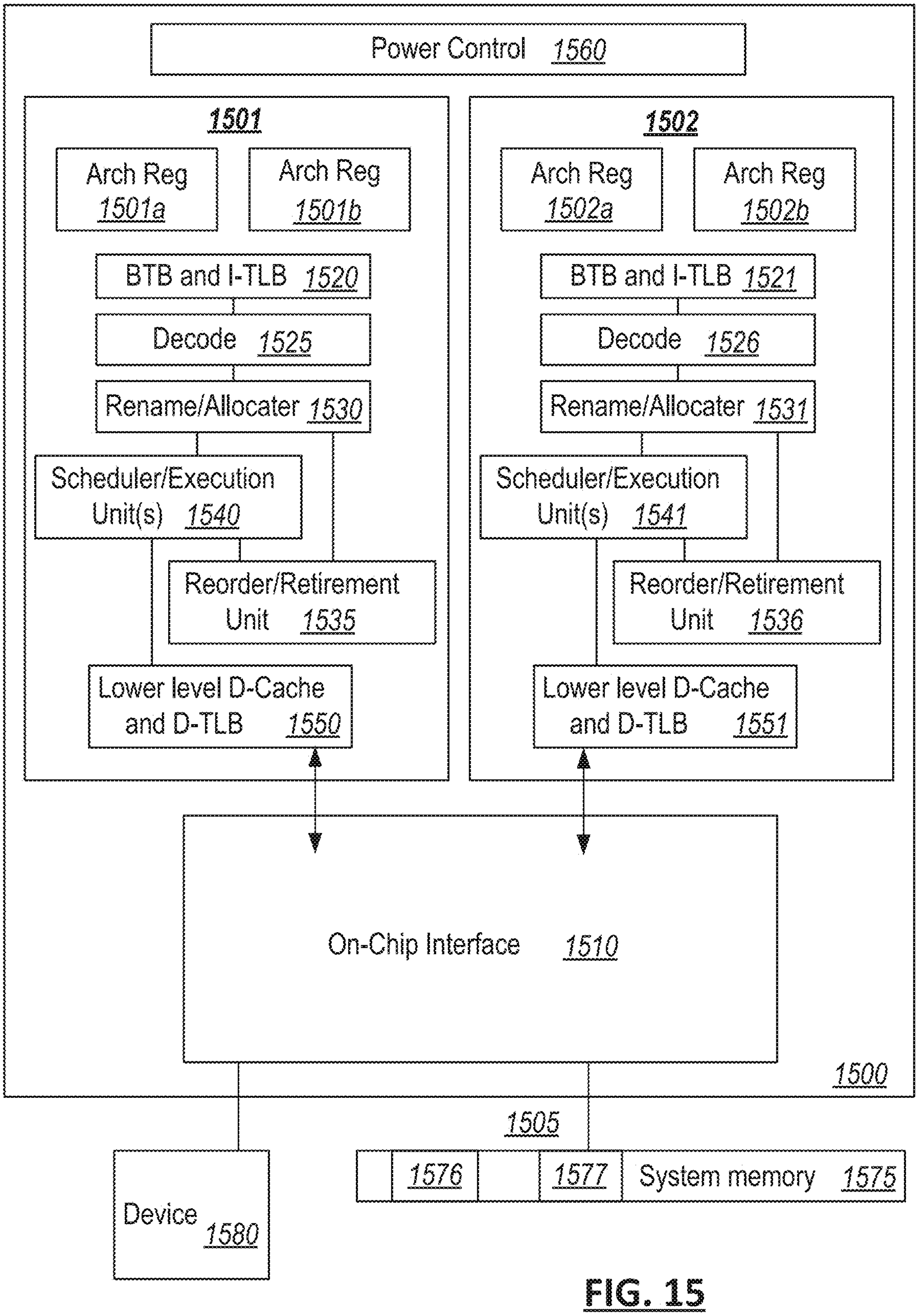
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501*a* and 1501*b*, which may also be referred to as hardware thread slots 1501*a* and 1501*b*. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501*a*, a second thread is associated with architecture state registers 1501*b*, a third thread may be associated with architecture state registers 1502*a*, and a fourth thread may be associated with architecture state registers 1502*b*. Here, each of the architecture state registers (1301*a*, 1501*b*, 1502*a*, and 1502*b*) may be referred to as processing elements, thread slots, or thread units, as described above. As illustrated, architecture state registers 1501*a* are replicated in architecture state registers 1501*b*, so individual architecture states/contexts are capable of being stored for logical processor 1501*a* and logical processor 1501*b*. In core 1501, other smaller resources, such as instruction pointers and renaming logic in allocator and renamer block 1530 may also be replicated for threads 1501*a* and 1501*b*. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501*a*, 1501*b*, respectively. Usually core 1501 is associated with a first ISA, which defines/specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501*a* and 1501*b* are potentially capable of out-of-order execution, where allocator and renamer block 1530 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache—instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1500. For example in one embodiment, a memory controller hub is on the same package and/or die with processor 1500. Here, a portion of the core (an on-core portion) 1510 includes one or more controller(s) for interfacing with other devices such as memory 1575 or a graphics device 1580. The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
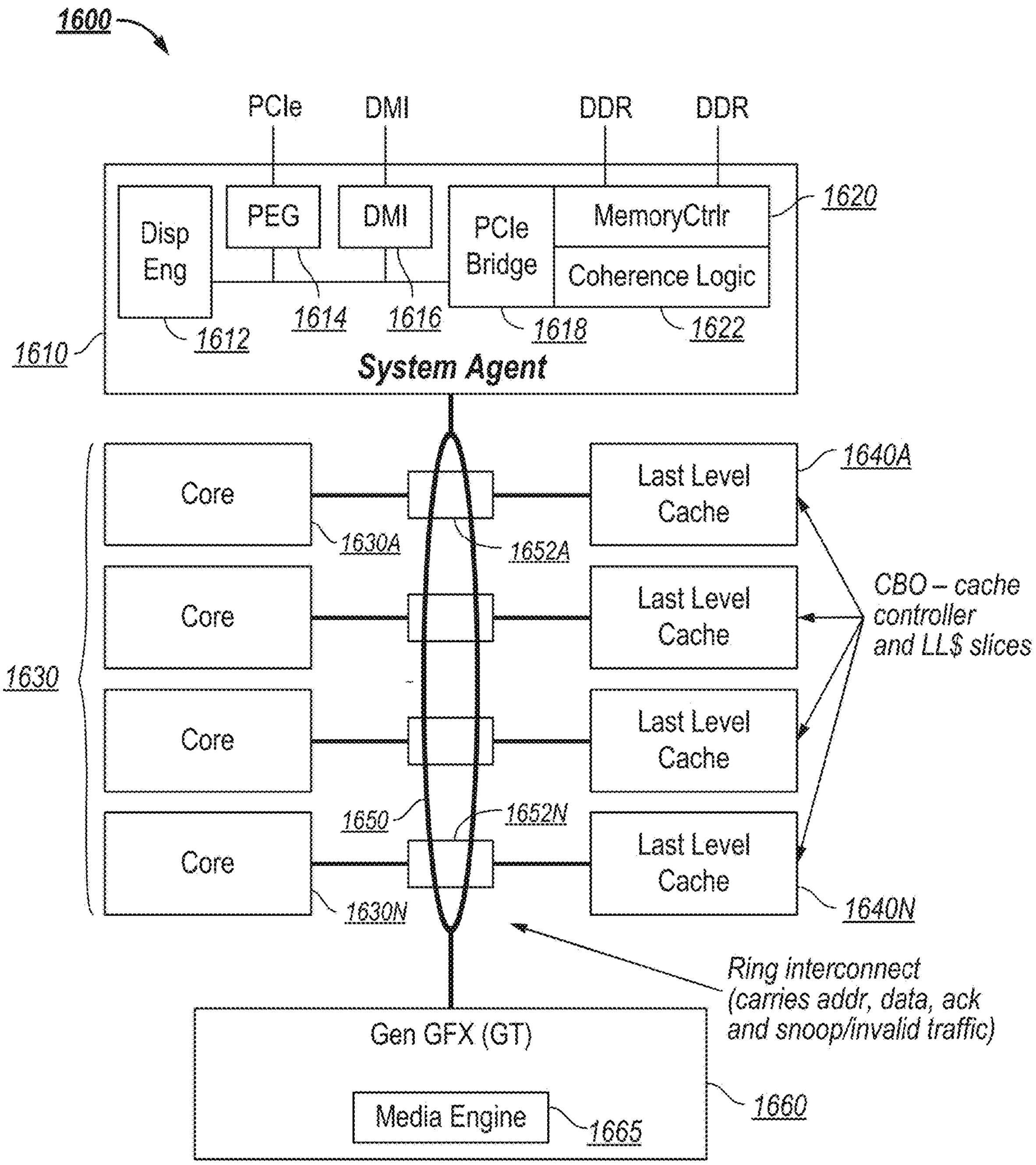
FIG. 16 illustrates another embodiment of a block diagram for a computing system including a multicore processor.

Referring now to FIG. 16, shown is a block diagram of an embodiment of a multicore processor. As shown in the embodiment of FIG. 16, processor 1600 includes multiple domains. Specifically, a core domain 1630 includes a plurality of cores 1630A-1630N, a graphics domain 1660 includes one or more graphics engines having a media engine 1665, and a system agent domain 1610.

In various embodiments, system agent domain 1610 handles power control events and power management, such that individual units of domains 1630 and 1660 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1630 and 1660 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1630 further includes low level caches in addition to various execution units and additional processing elements. Here, the various cores are coupled to each other and to a shared cache memory that is formed of a plurality of units or slices of a last level cache (LLC) 1640A-1640N; these LLCs often include storage and cache controller functionality and are shared amongst the cores, as well as potentially among the graphics engine too.

As seen, a ring interconnect 1650 couples the cores together, and provides interconnection between the core domain 1630, graphics domain 1660 and system agent circuitry 1610, via a plurality of ring stops 1652A-1652N, each at a coupling between a core and LLC slice. As seen in FIG. 16, interconnect 1650 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1610 includes display engine 1612 which is to provide control of and an interface to an associated display. System agent domain 1610 may include other units, such as: an integrated memory controller 1620 that provides for an interface to a system memory (e.g., a DRAM implemented with multiple DIMMs; coherence logic 1622 to perform memory coherence operations. Multiple interfaces may be present to enable interconnection between the processor and other circuitry. For example, in one embodiment at least one direct media interface (DMI) 1616 interface is provided as well as one or more PCIe™ interfaces 1614. The display engine and these interfaces typically couple to memory via a PCIe™ bridge 1618. Still further, to provide for communications between other agents, such as additional processors or other circuitry, one or more other interfaces may be provided.

Figure 17:
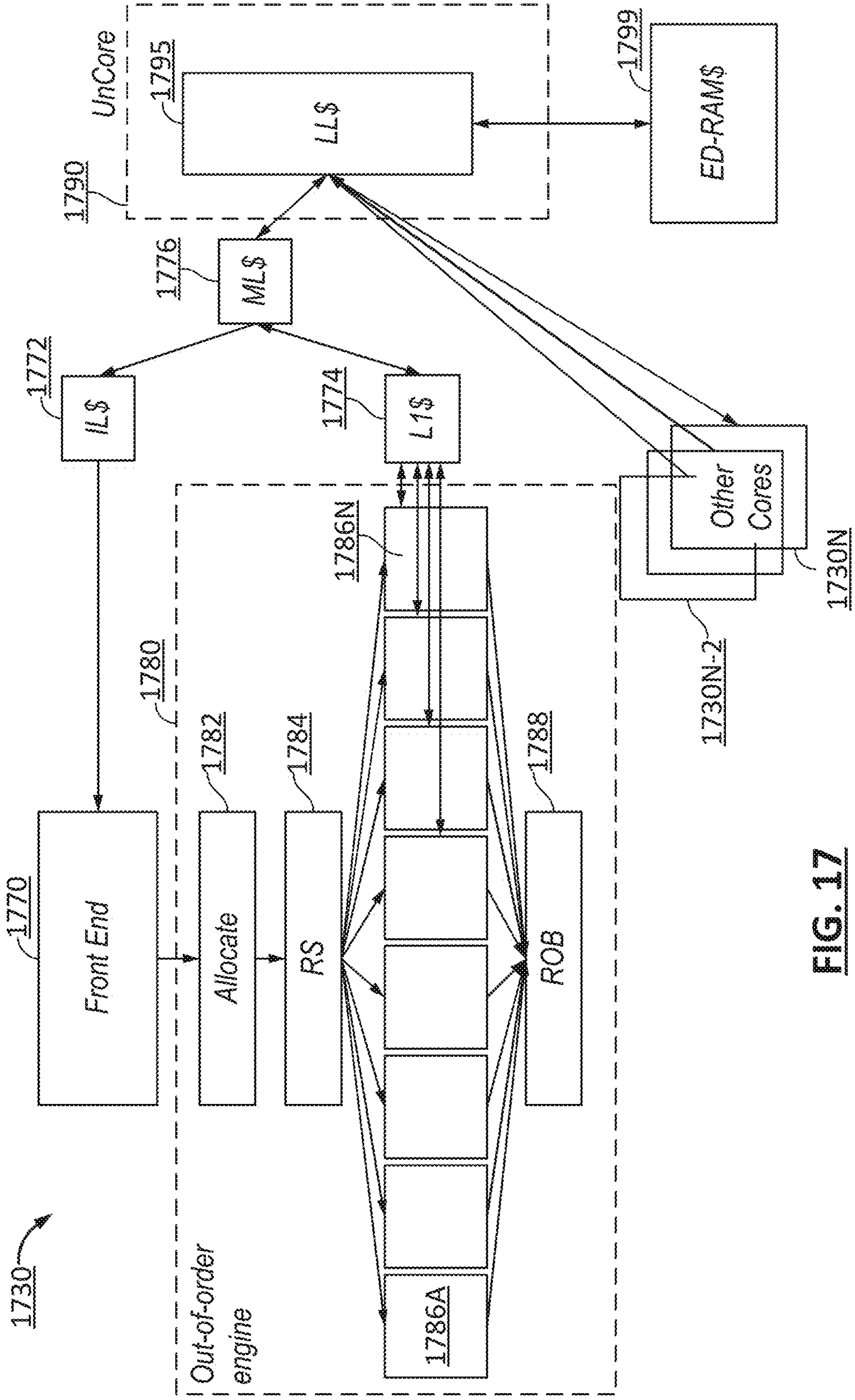
FIG. 17 illustrates an embodiment of a block diagram for a processor.

Referring now to FIG. 17, shown is a block diagram of a representative core; specifically, logical blocks of a back-end of a core, such as core 1630 from FIG. 16. In general, the structure shown in FIG. 17 includes an out-of-order processor that has a front end unit 1770 used to fetch incoming instructions, perform various processing (e.g. caching, decoding, branch predicting, etc.) and passing instructions/operations along to an out-of-order (OOO) engine 1780. OOO engine 1780 performs further processing on decoded instructions.

Specifically in the embodiment of FIG. 17, out-of-order engine 1780 includes an allocate unit 1782 to receive decoded instructions, which may be in the form of one or more micro-instructions or uops, from front end unit 1770, and allocate them to appropriate resources such as registers and so forth. Next, the instructions are provided to a reservation station 1784, which reserves resources and schedules them for execution on one of a plurality of execution units 1786A-1786N. Various types of execution units may be present, including, for example, arithmetic logic units (ALUs), load and store units, vector processing units (VPUs), floating point execution units, among others. Results from these different execution units are provided to a reorder buffer (ROB) 1788, which take unordered results and return them to correct program order.

Still referring to FIG. 17, note that both front end unit 1770 and out-of-order engine 1780 are coupled to different levels of a memory hierarchy. Specifically shown is an instruction level cache 1772, that in turn couples to a mid-level cache 1776, that in turn couples to a last level cache 1795. In one embodiment, last level cache 1795 is implemented in an on-chip (sometimes referred to as uncore) unit 1790. As an example, unit 1790 is similar to system agent 1710 of FIG. 17. As discussed above, uncore 1790 communicates with system memory 1799, which, in the illustrated embodiment, is implemented via ED RAM. Note also that the various execution units 1786 within out-of-order engine 1780 are in communication with a first level cache 1774 that also is in communication with mid-level cache 1776. Note also that additional cores 1730N-2-1730N can couple to LLC 1795. Although shown at this high level in the embodiment of FIG. 17, understand that various alterations and additional components may be present.

Figure 18:
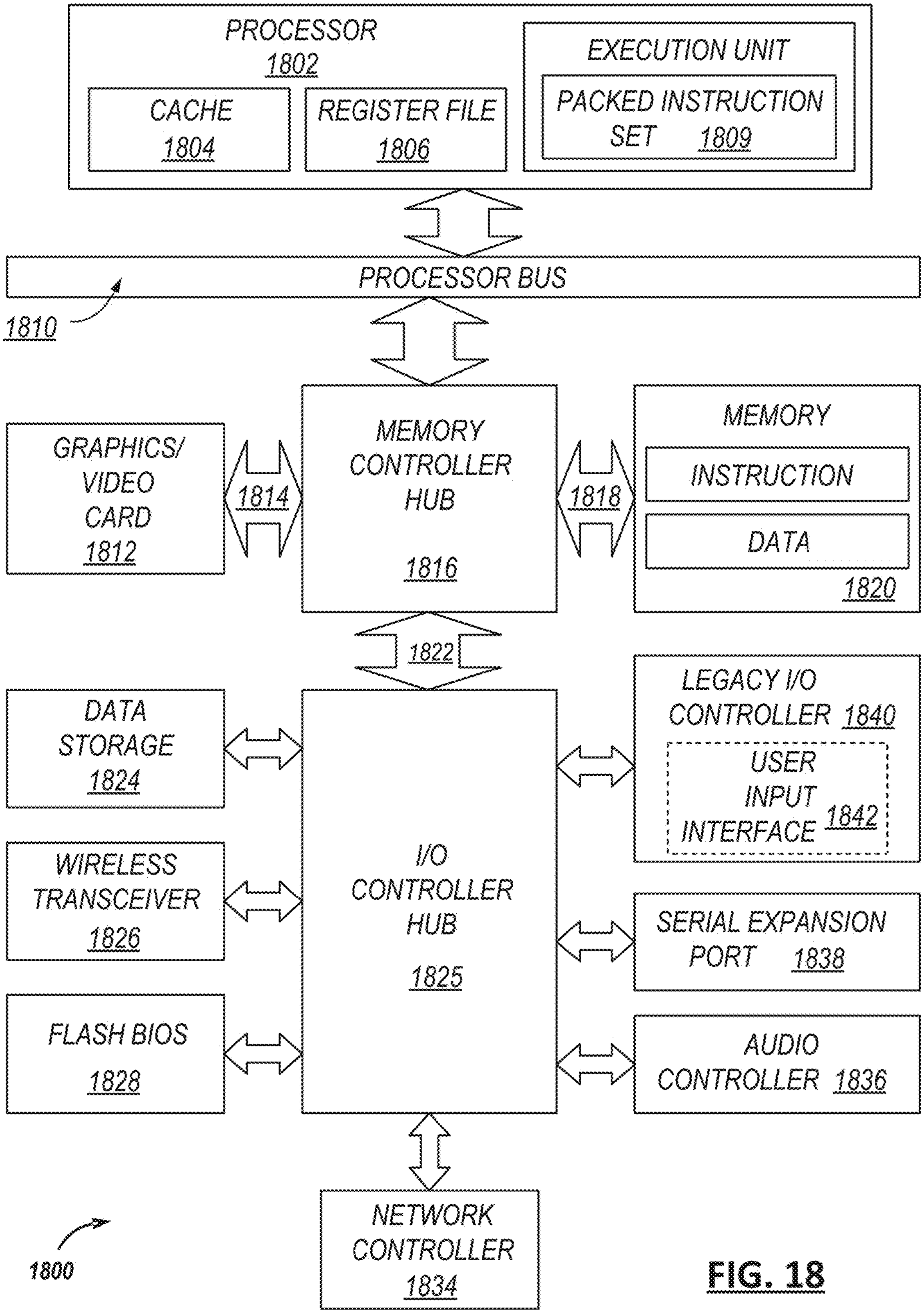
FIG. 18 illustrates another embodiment of a block diagram for a computing system including a processor.

Turning to FIG. 18, a block diagram of an exemplary computer system formed with a processor that includes execution units to execute an instruction, where one or more of the interconnects implement one or more features in accordance with one embodiment of the present disclosure is illustrated. System 1800 includes a component, such as a processor 1802 to employ execution units including logic to perform algorithms for process data, in accordance with the present disclosure, such as in the embodiment described herein. In one embodiment, sample system 1800 executes a version of an operating system and included software, and provides corresponding graphical user interfaces, may also be used. However, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1802 includes one or more execution units 1808 to implement an algorithm that is to perform at least one instruction. One embodiment may be described in the context of a single processor desktop or server system, but alternative embodiments may be included in a multiprocessor system. System 1800 is an example of a 'hub' system architecture. The computer system 1800 includes a processor 1802 to process data signals. The processor 1802, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1802 is coupled to a processor bus 1810 that transmits data signals between the processor 1802 and other components in the system 1800. The elements of system 1800 (e.g. graphics accelerator 1812, memory controller hub 1816, memory 1820, I/O controller hub 1825, wireless transceiver 1826, Flash BIOS 1828, Network controller 1834, Audio controller 1836, Serial expansion port 1838, I/O controller 1840, etc.) perform their conventional functions that are well known to those familiar with the art.

In one embodiment, the processor 1802 includes a Level 1 (L1) internal cache memory 1804. Depending on the architecture, the processor 1802 may have a single internal cache or multiple levels of internal caches. Other embodiments include a combination of both internal and external caches depending on the particular implementation and needs. Register file 1806 is to store different types of data in various registers including integer registers, floating point registers, vector registers, banked registers, shadow registers, checkpoint registers, status registers, and instruction pointer register.

Execution unit 1808, including logic to perform integer and floating point operations, also resides in the processor 1802. The processor 1802, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1802. For one embodiment, execution unit 1808 includes logic to handle a packed instruction set 1809. By including the packed instruction set 1809 in the instruction set of a general-purpose processor 1802, along with associated circuitry to execute the instructions, the operations used by many multimedia applications may be performed using packed data in a general-purpose processor 1802. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1808 may also be used in micro controllers, embedded processors, graphics devices, DSPs, and other types of logic circuits. System 1800 includes a memory 1820. Memory 1820 includes a dynamic random access memory (DRAM) device, a static random access memory (SRAM) device, flash memory device, or other memory device. Memory 1820 stores instructions and/or data represented by data signals that are to be executed by the processor 1802.

Note that any of the aforementioned features or aspects of the present disclosure and solutions may be utilized on one or more interconnect illustrated in FIG. 18. For example, an on-die interconnect (ODI), which is not shown, for coupling internal units of processor 1802 implements one or more aspects of the embodiments described above. Or the embodiments may be associated with a processor bus 1810 (e.g. other known high performance computing interconnect), a high bandwidth memory path 1818 to memory 1820, a point-to-point link to graphics accelerator 1812 (e.g. a Peripheral Component Interconnect express (PCIe) compliant fabric), a controller hub interconnect 1822, an I/O or other interconnect (e.g. USB, PCI, PCIe) for coupling the other illustrated components. Some examples of such components include the audio controller 1836, firmware hub (flash BIOS) 1828, wireless transceiver 1826, data storage 1824, legacy I/O controller 1810 containing user input and keyboard interfaces 1842, a serial expansion port 1838 such as Universal Serial Bus (USB), and a network controller 1834. The data storage device 1824 can comprise a hard disk drive, a floppy disk drive, a CD-ROM device, a flash memory device, or other mass storage device.

Figure 19:
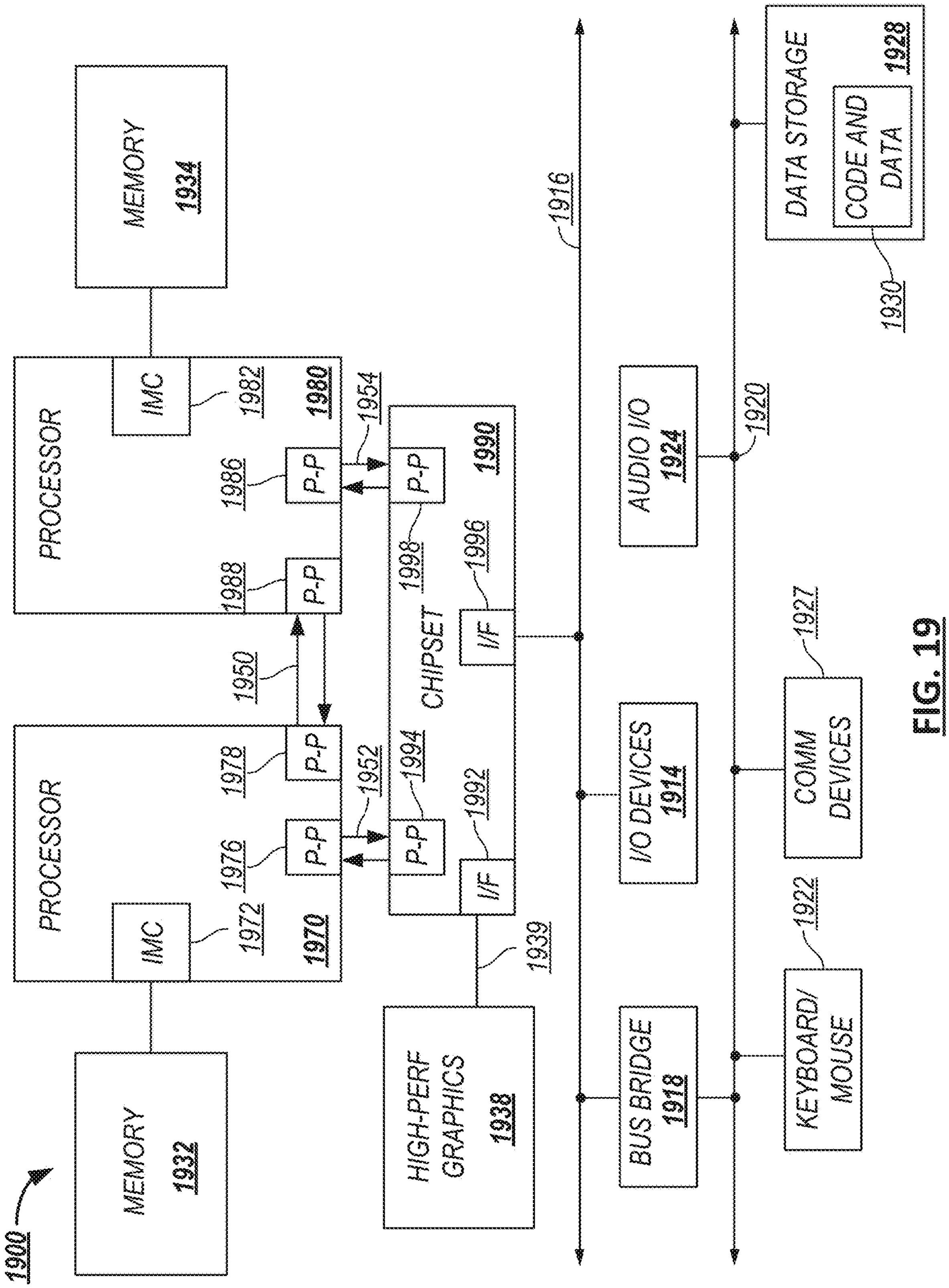
FIG. 19 illustrates an embodiment of a block for a computing system including multiple processors.

Referring now to FIG. 19, shown is a block diagram of a second system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of a processor. In one embodiment, 1952 and 1954 are part of a serial, point-to-point coherent interconnect fabric, such as a high-performance architecture.

While shown with only two processors 1970, 1980, it is to be understood that the scope of the present disclosure is not so limited. In other embodiments, one or more additional processors may be present in a given processor.

Processors 1970 and 1980 are shown including integrated memory controller units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 each exchange information with a chipset 1990 via individual P-P interfaces 1952, 1954 using point to point interface circuits 1976, 1994, 1986, 1998. Chipset 1990 also exchanges information with a high-performance graphics circuit 1938 via an interface circuit 1992 along a high-performance graphics interconnect 1939.

A shared cache (not shown) may be included in either processor or outside of both processors; yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 are coupled to first bus 1916, along with a bus bridge 1918 which couples first bus 1916 to a second bus 1920. In one embodiment, second bus 1920 includes a low pin count (LPC) bus. Various devices are coupled to second bus 1920 including, for example, a keyboard and/or mouse 1922, communication devices 1927 and a storage unit 1928 such as a disk drive or other mass storage device which often includes instructions/code and data 1930, in one embodiment. Further, an audio I/O 1924 is shown coupled to second bus 1920. Note that other architectures are possible, where the included components and interconnect architectures vary. For example, instead of the point-to-point architecture of FIG. 19, a system may implement a multi-drop bus or other such architecture.

Figure 20:
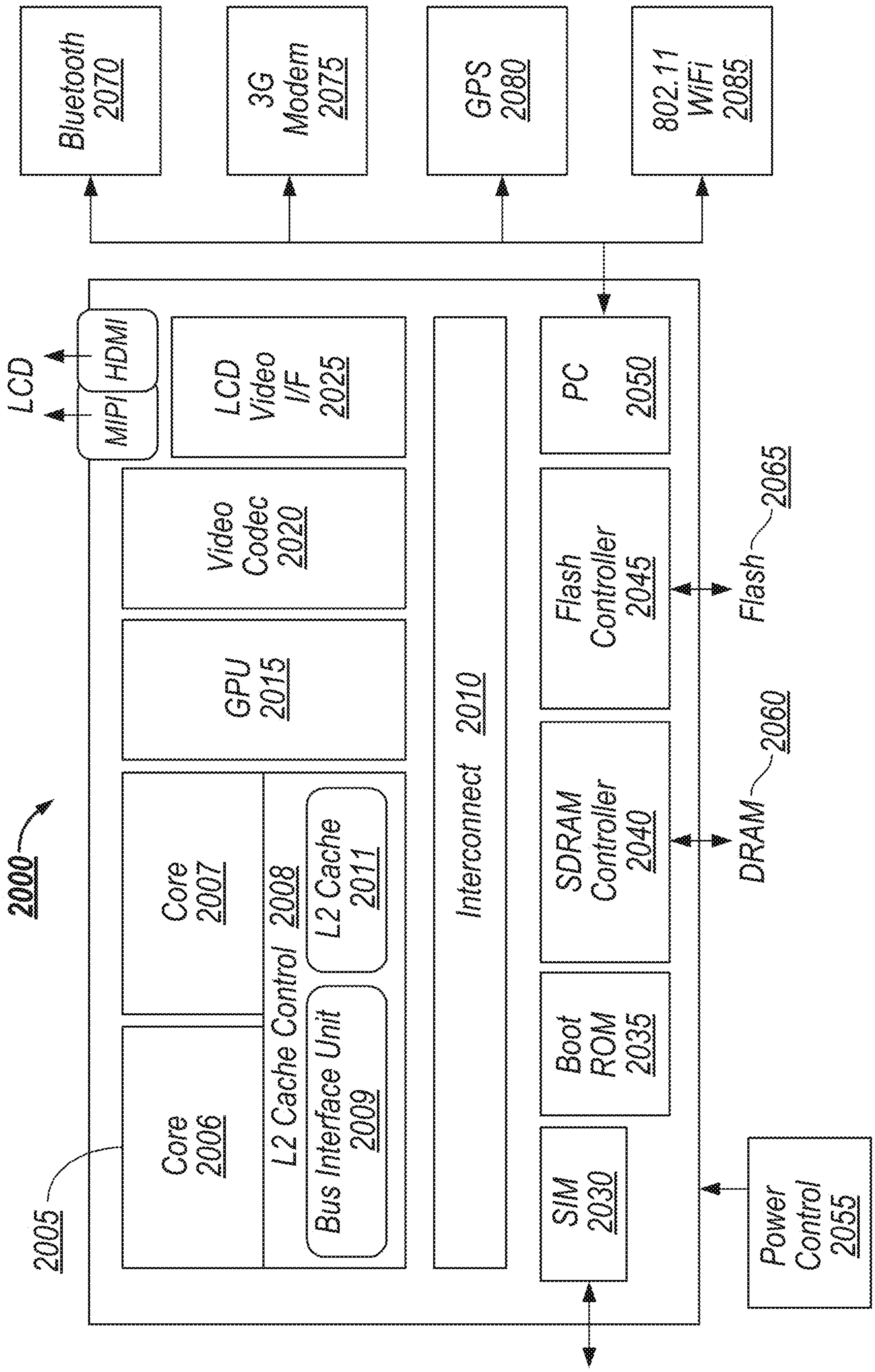
FIG. 20 illustrates an example system implemented as system on chip (SoC).

Turning next to FIG. 20, an embodiment of a system on-chip (SOC) design in accordance with the above disclosure is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or other interconnect discussed above, which potentially implements one or more aspects of described herein.

Interface 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects of the embodiments described herein.

In addition, the system illustrates peripherals for communication, such as a Bluetooth module 2070, 3G modem 2075, GPS 2085, and WiFi 2085. Note as stated above, a UE includes a radio for communication. As a result, these peripheral communication modules are not all required. However, in a UE some form a radio for external communication is to be included.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: agent circuitry to support a set of coherent interconnect protocols; and an interface to couple to an interconnect fabric, where the interface is configured to support the set of coherent interconnect protocols, and the interface includes: a global channel to couple to a first plurality of physical lanes, where the global channel is to communicate control signals to support the interface; a request channel to couple to a second plurality of physical lanes, where the request channel is to communicate messages associated with requests to other agents on the fabric; a response channel to couple to a third plurality of physical lanes, where the response channel is to communicate messages associated with responses to other agents on the fabric, and the responses includes responses without payload data; and a data channel to couple to a fourth plurality of physical lanes, where the data channel is to communicate messages associated with data transfers to other agents on the fabric, where the data transfers include payload data.

Example 2 includes the subject matter of example 1, where the requests are to target memory of a system.

Example 3 includes the subject matter of any one of examples 1-2, where each of the request channel, response channel, and data channel includes a respective plurality of signals, each signal in the plurality of signals is assigned to a respective subset of the physical lanes of the channel.

Example 4 includes the subject matter of example 3, where a first portion of the plurality of signals are sent to the fabric and a second portion of the plurality of signals are received from the fabric.

Example 5 includes the subject matter of any one of examples 3-4, where each of the pluralities of signals of the request channel, response channel, and data channel includes a respective valid signal, a protocol identifier signal, a virtual channel identifier field, and a header signal, where the valid signal is to be asserted in alignment with a valid instance of the header signal, the header signal includes a header of a particular message, the protocol identifier signal identifies a protocol associated with the header, and the virtual channel identifier signal identifies a virtual channel used for the particular message.

Example 6 includes the subject matter of example 5, where the set of coherent interconnect protocols includes a plurality of protocols, and the protocol identifier signal identifies one of the plurality of protocols as associated with the header.

Example 7 includes the subject matter of example 6, where the plurality of protocols include Compute Express Link (CXL) protocols, and the CXL protocols include a CXL.cache protocol and a CXL.mem protocol.

Example 8 includes the subject matter of any one of examples 6-7, where the header signal has a width to support a largest header format of the plurality of protocols.

Example 9 includes the subject matter of any one of examples 5-8, where the plurality of signals for the data channel further includes a payload data signal to carry the payload data, and the payload data signal includes a plurality of lanes.

Example 10 includes the subject matter of example 9, where the payload data signal corresponds to the header signal, and the payload data signal is to be sent a number of clock cycles after sending of the header signal.

Example 11 includes the subject matter of example 10, where the number of clock cycles includes a configurable parameter of the interface.

Example 12 includes the subject matter of any one of examples 5-11, where each of the pluralities of signals of the request channel, response channel, and data channel further includes credit return signals to support receiving credit returns associated with the respective channel.

Example 13 includes the subject matter of example 12, where credits are to be returned on the credit return signals in parallel with transmission of messages using at least the header signal.

Example 14 includes the subject matter of any one of examples 12-13, where the credit returns include returns of virtual channel dedicated credits and shared credits.

Example 15 includes the subject matter of any one of examples 5-14, where each of the pluralities of signals of the request channel, response channel, and data channel further includes a blocking signal to receive a blocking request, where the blocking request is to cause a de-assertion of the valid signal of the corresponding channel.

Example 16 includes the subject matter of example 15, where the valid signal is to be de-asserted a particular number of clock cycles after assertion of the blocking signal.

Example 17 includes the subject matter of example 16, where the particular number of clock cycles includes a configurable parameter of the interface.

Example 18 includes the subject matter of any one of examples 3-17, where the global channel includes an agent-to-fabric instance of the global channel, the request channel includes an agent-to-fabric instance of the request channel, the response channel includes an agent-to-fabric instance of the response channel, and the data channel includes an agent-to-fabric instance of the data channel; and where the interface further includes a fabric-to-agent instance of the global channel assigned to a fifth plurality of physical lanes, a fabric-to-agent instance of the request channel assigned to a sixth plurality of physical lanes, a fabric-to-agent instance of the response channel assigned to a seventh plurality of physical lanes, and a fabric-to-agent instance of the data channel assigned to a eighth plurality of physical lanes.

Example 19 includes the subject matter of any one of examples 1-18, where the set of protocols includes a plurality of protocols, and the request channel, the response channel, and the data channel are to support messages of each of the plurality of protocols.

Example 20 includes the subject matter of any one of examples 1-19, where the interface includes a second instance of one of the request channel, the response channel, and the data channel.

Example 21 includes the subject matter of any one of examples 1-20, where the global channel includes a set of signals to initialize the interface.

Example 22 includes the subject matter of example 21, where initialization of the interface is according to a state machine, the state machine includes a plurality of initialization states for the interface, and values of the set of signals cause transitions between the plurality of initialization states.

Example 23 includes the subject matter of any one of examples 1-22, further including compute block circuitry, where the compute block circuitry is to implement a compute block within a system on chip (SoC) and the interconnect fabric includes interconnect fabric of the SoC.

Example 24 includes the subject matter of example 23, where the compute block circuitry includes a data processor.

Example 25 includes the subject matter of any one of examples 23-24, where the compute block circuitry includes computer memory.

Example 26 is an apparatus including: fabric circuitry to implement at least a portion of an interconnect fabric of a system; and an interface to couple to an agent of a compute block, where the interface is configured to support the set of coherent interconnect protocols, and the interface includes: a global channel to couple to a first plurality of physical lanes, where the global channel is to communicate control signals to support the interface; a request channel to couple to a second plurality of physical lanes, where the request channel is to communicate messages associated with requests to the agent; a response channel to couple to a third plurality of physical lanes, where the response channel is to communicate messages associated with responses to the agent, and the responses includes responses without payload data; and a data channel to couple to a fourth plurality of physical lanes, where the data channel is to communicate messages associated with data transfers, where the data transfers include payload data.

Example 27 includes the subject matter of example 26, where the requests are to target memory of the compute block.

Example 28 includes the subject matter of any one of examples 26-27, where each of the request channel, response channel, and data channel includes a respective plurality of signals, each signal in the plurality of signals is assigned to a respective subset of the physical lanes of the channel.

Example 29 includes the subject matter of example 28, where a first portion of the plurality of signals are sent to the fabric and a second portion of the plurality of signals are received from the fabric.

Example 30 includes the subject matter of any one of examples 28-29, where each of the pluralities of signals of the request channel, response channel, and data channel includes a respective valid signal, a protocol identifier signal, a virtual channel identifier field, and a header signal, where the valid signal is to be asserted in alignment with a valid instance of the header signal, the header signal includes a header of a particular message, the protocol identifier signal identifies a protocol associated with the header, and the virtual channel identifier signal identifies a virtual channel used for the particular message.

Example 31 includes the subject matter of example 30, where the set of coherent interconnect protocols includes a plurality of protocols, and the protocol identifier signal identifies one of the plurality of protocols as associated with the header.

Example 32 includes the subject matter of example 31, where the plurality of protocols include Compute Express Link (CXL) protocols, and the CXL protocols include a CXL.cache protocol and a CXL.mem protocol.

Example 33 includes the subject matter of any one of examples 31-32, where the header signal has a width to support a largest header format of the plurality of protocols.

Example 34 includes the subject matter of any one of examples 30-33, where the plurality of signals for the data channel further includes a payload data signal to carry the payload data, and the payload data signal includes a plurality of lanes.

Example 35 includes the subject matter of example 34, where the payload data signal corresponds to the header signal, and the payload data signal is to be sent a number of clock cycles after sending of the header signal.

Example 36 includes the subject matter of example 35, where the number of clock cycles includes a configurable parameter of the interface.

Example 37 includes the subject matter of any one of examples 30-36, where each of the pluralities of signals of the request channel, response channel, and data channel further includes credit return signals to support receiving credit returns associated with the respective channel.

Example 38 includes the subject matter of example 37, where credits are to be returned on the credit return signals in parallel with transmission of messages using at least the header signal.

Example 39 includes the subject matter of any one of examples 37-38, where the credit returns include returns of virtual channel dedicated credits and shared credits.

Example 40 includes the subject matter of any one of examples 30-39, where each of the pluralities of signals of the request channel, response channel, and data channel further includes a blocking signal to receive a blocking request, where the blocking request is to cause a de-assertion of the valid signal of the corresponding channel.

Example 41 includes the subject matter of example 40, where the valid signal is to be de-asserted a particular number of clock cycles after assertion of the blocking signal.

Example 42 includes the subject matter of example 41, where the particular number of clock cycles includes a configurable parameter of the interface.

Example 43 includes the subject matter of any one of examples 28-42, where the global channel includes a fabric-to-agent instance of the global channel, the request channel includes a fabric-to-agent instance of the request channel, the response channel includes a fabric-to-agent instance of the response channel, and the data channel includes a fabric-to-agent instance of the data channel; and where the interface further includes an agent-to-fabric instance of the global channel assigned to a fifth plurality of physical lanes, an agent-to-fabric instance of the request channel assigned to a sixth plurality of physical lanes, an agent-to-fabric instance of the response channel assigned to a seventh plurality of physical lanes, and an agent-to-fabric instance of the data channel assigned to a eighth plurality of physical lanes.

Example 44 includes the subject matter of any one of examples 25-43, where the set of protocols includes a plurality of protocols, and the request channel, the response channel, and the data channel are to support messages of each of the plurality of protocols.

Example 45 includes the subject matter of any one of examples 25-44, where the interface includes a second instance of one of the request channel, the response channel, and the data channel.

Example 46 includes the subject matter of any one of examples 25-45, where the global channel includes a set of signals to initialize the interface.

Example 47 includes the subject matter of example 46, where initialization of the interface is according to a state machine, the state machine includes a plurality of initialization states for the interface, and values of the set of signals cause transitions between the plurality of initialization states.

Example 48 includes the subject matter of any one of examples 25-47, where the fabric circuitry includes a network on chip device and the network on chip device includes the interface.

Example 49 is a method including: receiving in a first clock cycle: an asserted valid signal on a set of valid lanes of a particular channel of an interface, a first header signal on a set of header lanes of the particular channel, a virtual channel identifier (VC_ID) signal on a set of VC_ID lanes of the particular channel, and a protocol identifier signal on a set of protocol identifier lanes of the particular channel, where the interface is to couple an agent to a fabric, the first header signal is to be aligned with the valid signal, the first header signal includes at least a portion of a header of a packet, the protocol identifier signal identifies a particular one of a plurality of coherent protocols supported on the interface to apply to the packet, and the particular channel includes one of a plurality of channels of the interface, where the plurality of channels includes a request channel, a data channel, and a response channel; receiving, in a subsequent clock cycle: the asserted valid signal, an asserted end of packet (EOP) signal on a set of EOP lanes of the particular channel, and a second header signal on the set of header lanes, where the second header signal includes at least a portion of the header of the packet; and determining an end of the packet based on the asserted EOP signal in the subsequent clock cycle with the asserted valid signal.

Example 50 includes the subject matter of example 49, further including identifying de-assertion of the valid signal, where de-assertion of the valid signal causes the header signal to be interrupted.

Example 51 includes the subject matter of any one of examples 49-50, further including receiving, in the first clock cycle, a shared credit signal on a set of shared credit lanes of the particular channel, where the shared credit signal identifies whether shared credits or dedicated credits are used with the header.

Example 52 includes the subject matter of example 51, where when the shared credit signal identifies that dedicated credits are used, the VC_ID signal identifies a particular virtual channel associated with the dedicated credits.

Example 53 includes the subject matter of any one of examples 49-52, where the particular channel includes the data channel, and the method further includes: receiving payload data on a set of lanes of a payload data signal of the data channel; and determining that the payload data is associated with the packet based on the header.

Example 54 includes the subject matter of example 53, where the payload data is defined to arrive a particular number of clock cycles following receipt of the header signal.

Example 55 includes the subject matter of example 54, where the particular number of clock cycles is configured in a header payload separation parameter of the interface.

Example 56 includes the subject matter of any one of examples 49-55, further including sending a blocking signal on blocking signal lanes of the particular channel, where the blocking signal is to cause de-assertion of the valid signal on the set of valid lanes.

Example 57 includes the subject matter of example 56, further including determining backpressure within a queue, where the blocking signal is sent based on the determined backpressure.

Example 58 includes the subject matter of any one of examples 49-57, where the width of the header signal is based on a largest header format among the plurality of coherent protocols.

Example 59 includes the subject matter of any one of examples 49-58, where the request channel is to communicate messages associated with requests to an agent, the response channel is to communicate messages associated with responses to the agent and the responses include responses without payload data, and the data channel is to communicate messages associated with data transfers including payload data.

Example 60 includes the subject matter of any one of examples 49-59, further including initializing the interface using a set of initialization signals in a global channel of the interconnect, where the global channel is associated with a plurality of global channel lanes, and each signal in the set of initialization signals are mapped to a respective one of the plurality of global channel lanes the lanes.

Example 61 includes the subject matter of example 60, where the initialization of the interface is according to a state machine, the state machine defines a plurality of initialization states, and transitions between the plurality of initialization states are based on values of the set of initialization signals.

Example 62 includes the subject matter of example 61, where messages are to be received on the channels after completion of the initialization of the interface.

Example 63 includes the subject matter of example 62, further including sending flow control credits on respective flow control signal lanes of each one of the request, response, and data channels upon completion of the initialization.

Example 64 includes the subject matter of any one of examples 49-63, further including sending credit returns one respective credit return lanes included in each one of the request channel, the response channel, and the data channel.

Example 65 includes the subject matter of example 64, where the credit returns include returns of dedicated and shared credits.

Example 66 includes the subject matter of any one of examples 49-65, where the plurality of coherent protocols include a CXL.mem protocol and a CXL.cache protocol.

Example 67 is a system including means to perform the method of any one of examples 49-66.

Example 68 is a method including: sending, in a first clock cycle: an asserted valid signal on a set of valid lanes of a particular channel of an interface, a first header signal on a set of header lanes of the particular channel, a virtual channel identifier (VC_ID) signal on a set of VC_ID lanes of the particular channel, and a protocol identifier signal on a set of protocol identifier lanes of the particular channel, where the interface is to couple an agent to a fabric, the first header signal is to be aligned with the valid signal, the first header signal includes at least a portion of a header of a packet, the protocol identifier signal identifies a particular one of a plurality of coherent protocols supported on the interface to apply to the packet, and the particular channel includes one of a plurality of channels of the interface, where the plurality of channels includes a request channel, a data channel, and a response channel; determining an end of the packet; and sending, in a subsequent clock cycle: the asserted valid signal, an asserted end of packet (EOP) signal on a set of EOP lanes of the particular channel, and a second header signal on the set of header lanes, where the second header signal includes at least a portion of the header of the packet, and the asserted EOP signal identifies the end of the packet.

Example 69 includes the subject matter of example 68, further including identifying de-assertion of the valid signal, where de-assertion of the valid signal causes the header signal to be interrupted.

Example 70 includes the subject matter of any one of examples 68-69, further including sending, in the first clock cycle, a shared credit signal on a set of shared credit lanes of the particular channel, where the shared credit signal identifies whether shared credits or dedicated credits are used with the header.

Example 71 includes the subject matter of example 70, where when the shared credit signal identifies that dedicated credits are used, the VC_ID signal identifies a particular virtual channel associated with the dedicated credits.

Example 72 includes the subject matter of any one of examples 68-71, where the particular channel includes the data channel, and the method further includes sending payload data on a set of lanes of a payload data signal of the data channel.

Example 73 includes the subject matter of example 72, where the payload data is defined to be sent a particular number of clock cycles following receipt of the header signal.

Example 74 includes the subject matter of example 73, where the particular number of clock cycles is configured in a header payload separation parameter of the interface.

Example 75 includes the subject matter of any one of examples 68-74, further including: receiving a blocking signal on blocking signal lanes of the particular channel; and de-asserting the valid signal on the set of valid lanes based on receipt of the blocking signal.

Example 76 includes the subject matter of example 75, further including determining a defined number of clock cycles in a configuration parameter of the interface, where the valid signal is de-asserted the number of clock cycles after receipt of the blocking signal.

Example 77 includes the subject matter of any one of examples 68-76, where the width of the header signal is based on a largest header format among the plurality of coherent protocols.

Example 78 includes the subject matter of any one of examples 68-77, where the request channel is to communicate messages associated with requests to an agent, the response channel is to communicate messages associated with responses to the agent and the responses include responses without payload data, and the data channel is to communicate messages associated with data transfers including payload data.

Example 79 includes the subject matter of any one of examples 68-78, further including initializing the interface using a set of initialization signals in a global channel of the interconnect, where the global channel is associated with a plurality of global channel lanes, and each signal in the set of initialization signals are mapped to a respective one of the plurality of global channel lanes the lanes.

Example 80 includes the subject matter of example 79, where the initialization of the interface is according to a state machine, the state machine defines a plurality of initialization states, and transitions between the plurality of initialization states are based on values of the set of initialization signals.

Example 81 includes the subject matter of example 80, where messages are to be sent on the channels after completion of the initialization of the interface.

Example 82 includes the subject matter of example 81, further including receiving flow control credits on respective flow control signal lanes of each one of the request, response, and data channels upon completion of the initialization.

Example 83 includes the subject matter of any one of examples 68-82, further including receiving credit returns one respective credit return lanes included in each one of the request channel, the response channel, and the data channel.

Example 84 includes the subject matter of example 83, where the credit returns include returns of dedicated and shared credits.

Example 85 includes the subject matter of any one of examples 68-84, where the plurality of coherent protocols include a CXL.mem protocol and a CXL.cache protocol.

Example 86 is a system including means to perform the method of any one of examples 68-85.

Example 87 is a system including: a fabric; and a plurality of compute blocks communicatively coupled through the fabric, where a particular compute block in the plurality of compute blocks includes: agent circuitry to support a set of coherent interconnect protocols; and an interface to couple to an interconnect fabric, where the interface is configured to support the set of coherent interconnect protocols, and the interface includes: a global channel to couple to a first plurality of physical lanes, where the global channel is to communicate control signals to support the interface; a request channel to couple to a second plurality of physical lanes, where the request channel is to communicate messages associated with requests to other agents on the fabric; a response channel to couple to a third plurality of physical lanes, where the response channel is to communicate messages associated with responses to other agents on the fabric, and the responses includes responses without payload data; and a data channel to couple to a fourth plurality of physical lanes, where the data channel is to communicate messages associated with data transfers to other agents on the fabric, where the data transfers include payload data.

Example 88 includes the subject matter of example 87, where the system includes a system on chip (SoC), and the SoC includes the fabric and the plurality of compute blocks.

Example 89 includes the subject matter of any one of examples 87-88, where the fabric includes a network on chip device.

Example 90 includes the subject matter of any one of examples 87-89, further including computer memory, where the requests are to target the computer memory.

Example 91 includes the subject matter of any one of examples 87-90, where each of the request channel, response channel, and data channel includes a respective plurality of signals, each signal in the plurality of signals is assigned to a respective subset of the physical lanes of the channel.

Example 92 includes the subject matter of example 91, where a first portion of the plurality of signals are sent to the fabric and a second portion of the plurality of signals are received from the fabric.

Example 93 includes the subject matter of any one of examples 91-92, where each of the pluralities of signals of the request channel, response channel, and data channel includes a respective valid signal, a protocol identifier signal, a virtual channel identifier field, and a header signal, where the valid signal is to be asserted in alignment with a valid instance of the header signal, the header signal includes a header of a particular message, the protocol identifier signal identifies a protocol associated with the header, and the virtual channel identifier signal identifies a virtual channel used for the particular message.

Example 94 includes the subject matter of example 93, where the set of coherent interconnect protocols includes a plurality of protocols, and the protocol identifier signal identifies one of the plurality of protocols as associated with the header.

Example 95 includes the subject matter of example 94, where the plurality of protocols include Compute Express Link (CXL) protocols, and the CXL protocols include a CXL.cache protocol and a CXL.mem protocol.

Example 96 includes the subject matter of any one of examples 94-95, where the header signal has a width to support a largest header format of the plurality of protocols.

Example 97 includes the subject matter of any one of examples 93-96, where the plurality of signals for the data channel further includes a payload data signal to carry the payload data, and the payload data signal includes a plurality of lanes.

Example 98 includes the subject matter of example 97, where the payload data signal corresponds to the header signal, and the payload data signal is to be sent a number of clock cycles after sending of the header signal.

Example 99 includes the subject matter of example 98, where the number of clock cycles includes a configurable parameter of the interface.

Example 100 includes the subject matter of any one of examples 93-99, where each of the pluralities of signals of the request channel, response channel, and data channel further includes credit return signals to support receiving credit returns associated with the respective channel.

Example 101 includes the subject matter of example 100, where credits are to be returned on the credit return signals in parallel with transmission of messages using at least the header signal.

Example 102 includes the subject matter of any one of examples 100-101, where the credit returns include returns of virtual channel dedicated credits and shared credits.

Example 103 includes the subject matter of any one of examples 93-102, where each of the pluralities of signals of the request channel, response channel, and data channel further includes a blocking signal to receive a blocking request, where the blocking request is to cause a de-assertion of the valid signal of the corresponding channel.

Example 104 includes the subject matter of example 103, where the valid signal is to be de-asserted a particular number of clock cycles after assertion of the blocking signal.

Example 105 includes the subject matter of example 104, where the particular number of clock cycles includes a configurable parameter of the interface.

Example 106 includes the subject matter of any one of examples 91-105, where the global channel includes an agent-to-fabric instance of the global channel, the request channel includes an agent-to-fabric instance of the request channel, the response channel includes an agent-to-fabric instance of the response channel, and the data channel includes an agent-to-fabric instance of the data channel; and where the interface further includes a fabric-to-agent instance of the global channel assigned to a fifth plurality of physical lanes, a fabric-to-agent instance of the request channel assigned to a sixth plurality of physical lanes, a fabric-to-agent instance of the response channel assigned to a seventh plurality of physical lanes, and a fabric-to-agent instance of the data channel assigned to a eighth plurality of physical lanes.

Example 107 includes the subject matter of any one of examples 87-106, where the set of protocols includes a plurality of protocols, and the request channel, the response channel, and the data channel are to support messages of each of the plurality of protocols.

Example 108 includes the subject matter of any one of examples 87-107, where the interface includes a second instance of one of the request channel, the response channel, and the data channel.

Example 109 includes the subject matter of any one of examples 87-108, where the global channel includes a set of signals to initialize the interface.

Example 110 includes the subject matter of example 109, where initialization of the interface is according to a state machine, the state machine includes a plurality of initialization states for the interface, and values of the set of signals cause transitions between the plurality of initialization states.

Example 111 includes the subject matter of any one of examples 87-110, further including compute block circuitry, where the compute block circuitry is to implement a compute block within a system on chip (SoC) and the interconnect fabric includes interconnect fabric of the SoC.

Example 112 includes the subject matter of example 111, where the compute block circuitry includes a data processor.

Example 113 includes the subject matter of example 111, where the compute block circuitry includes computer memory.

Example 114 includes the subject matter of any one of examples 1-113, where the interface includes an unequal number of request channels, response channels, and data channels.

Example 115 includes the subject matter of any one of examples 1-114, where the interface includes at least one of each of the request channel, the response channel, and the data channel.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:

agent circuitry to support a set of coherent interconnect protocols; and an interface to couple to an interconnect fabric, wherein the interface is configured to support the set of coherent interconnect protocols, and the interface comprises:

a global channel to use a first plurality of physical lanes, wherein the global channel is to communicate control signals to support the interface;

a request channel to use a second plurality of physical lanes, wherein the request channel is to communicate messages associated with requests to other agents on the fabric;

a response channel to use a third plurality of physical lanes, wherein the response channel is to communicate messages associated with responses to other agents on the fabric, and the responses comprises responses without payload data; and a data channel to use a fourth plurality of physical lanes, wherein the data channel is to communicate messages associated with data transfers to other agents on the fabric, wherein the data transfers comprise payload data.

2. The apparatus of claim 1, wherein each of the request channel, response channel, and data channel comprises a respective plurality of signals, each signal in the plurality of signals is assigned to a respective subset of the physical lanes of the channel.

3. The apparatus of claim 2, wherein a first portion of the plurality of signals are sent to the fabric and a second portion of the plurality of signals are received from the fabric.

4. The apparatus of claim 2, wherein each of the pluralities of signals of the request channel, the response channel, and the data channel comprises:

a respective valid signal, a protocol identifier signal, a virtual channel identifier field, and a header signal, wherein the valid signal is to be asserted in alignment with a valid instance of the header signal, the header signal comprises a header of a particular message, the protocol identifier signal identifies a protocol associated with the header, and the virtual channel identifier signal identifies a virtual channel used for the particular message.

5. The apparatus of claim 4, wherein the set of coherent interconnect protocols comprises a plurality of protocols, and the protocol identifier signal identifies one of the plurality of protocols as associated with the header.

6. The apparatus of claim 5, wherein the plurality of protocols comprise Compute Express Link (CXL) protocols, and the CXL protocols comprise a CXL.cache protocol and a CXL.mem protocol.

7. The apparatus of claim 5, wherein the header signal has a width to support a largest header format of the plurality of protocols.

8. The apparatus of claim 4, wherein the plurality of signals for the data channel further comprises a payload data signal to carry the payload data, and the payload data signal is assigned a portion of the physical lanes of the data channel.

9. The apparatus of claim 8, wherein the payload data signal corresponds to the header signal, and the payload data signal is to be sent a number of clock cycles after sending of the header signal, wherein the number of clock cycles comprises a configurable parameter of the interface.

10. The apparatus of claim 4, wherein each of the pluralities of signals of the request channel, response channel, and data channel further comprises credit return signals to support receiving credit returns associated with the respective channel, wherein credits are to be returned on the credit return signals in parallel with transmission of messages on the same channel.

11. The apparatus of claim 10, wherein the credit returns comprise returns of virtual channel dedicated credits and shared credits.

12. The apparatus of claim 4, wherein each of the pluralities of signals of the request channel, response channel, and data channel further comprises a blocking signal to receive a blocking request, wherein the blocking request is to cause a de-assertion of the valid signal of the corresponding channel.

13. The apparatus of claim 12, wherein the valid signal is to be de-asserted a particular number of clock cycles after assertion of the blocking signal, and the particular number of clock cycles comprises a configurable parameter of the interface.

14. The apparatus of claim 1, wherein the global channel comprises a set of signals to initialize the interface.

15. The apparatus of claim 14, wherein initialization of the interface is according to a state machine, the state machine comprises a plurality of initialization states for the interface, and values of the set of signals cause transitions between the plurality of initialization states.

16. A method comprising:

receiving in a first clock cycle: an asserted valid signal on a set of valid lanes of a particular channel of an interface, a first header signal on a set of header lanes of the particular channel, a virtual channel identifier (VC_ID) signal on a set of VC_ID lanes of the particular channel, and a protocol identifier signal on a set of protocol identifier lanes of the particular channel, wherein the interface is to couple an agent to a fabric, the first header signal is to be aligned with the valid signal, the first header signal comprises at least a portion of a header of a packet, the protocol identifier signal identifies a particular one of a plurality of coherent protocols supported on the interface to apply to the packet, and the particular channel comprises one of a plurality of channels of the interface, wherein the plurality of channels comprises a request channel, a data channel, and a response channel;

receiving, in a subsequent clock cycle: the asserted valid signal, an asserted end of packet (EOP) signal on a set of EOP lanes of the particular channel, and a second header signal on the set of header lanes, wherein the second header signal comprises at least a portion of the header of the packet; and determining an end of the packet based on the asserted EOP signal in the subsequent clock cycle with the asserted valid signal.

17. The method of claim 16, further comprising receiving, in the first clock cycle, a shared credit signal on a set of shared credit lanes of the particular channel, wherein the shared credit signal identifies whether shared credits or dedicated credits are used with the header, and the VC ID signal identifies a particular virtual channel associated with dedicated credits when the shared credit signal identifies that dedicated credits are used.

18. The method of claim 16, further comprising:

determining backpressure within a queue; and sending a blocking signal on blocking signal lanes of the particular channel, wherein the blocking signal is sent based on the backpressure, and the blocking signal is to cause de-assertion of the valid signal on the set of valid lanes.

19. A system comprising:

a fabric; and a plurality of compute blocks communicatively coupled through the fabric, wherein a particular compute block in the plurality of compute blocks comprises:

agent circuitry to support a set of coherent interconnect protocols; and an interface to couple to the fabric, wherein the interface is configured to support the set of coherent interconnect protocols, and the interface comprises:

a global channel to couple to a first plurality of physical lanes, wherein the global channel is to communicate control signals to support the interface;

a number of request channels to couple to a second plurality of physical lanes, wherein each of the request channels is to communicate messages associated with requests to other agents on the fabric;

a number of response channels to couple to a third plurality of physical lanes, wherein each of the response channels is to communicate messages associated with responses to other agents on the fabric, and the responses comprises responses without payload data; and a number of data channels to couple to a fourth plurality of physical lanes, wherein each of the data channels is to communicate messages associated with data transfers to other agents on the fabric, wherein the data transfers comprise payload data.

20. The system of claim 19, wherein the system comprises a system on chip (SoC), and the SoC comprises the fabric and the plurality of compute blocks.

21. The system of claim 19, wherein the fabric comprises a network on chip device.

22. The system of claim 19, further comprising computer memory, wherein the requests are to target the computer memory.

23. The system of claim 19, wherein set of coherent interconnect protocols a CXL.cache protocol and a CXL.mem protocol.

24. The system of claim 19, wherein the interface comprises an unequal number of request channels, response channels, and data channels.

25. The system of claim 19, wherein the interface comprises at least one of each of the request channel, the response channel, and the data channel.

* * * * *